United States Patent
Lee et al.

(10) Patent No.: US 10,887,736 B2
(45) Date of Patent: Jan. 5, 2021

(54) METHOD FOR V2X TRANSMISSION RESOURCE SELECTION PERFORMED BY MEANS OF TERMINAL IN WIRELESS COMMUNICATION SYSTEM AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/090,555

(22) PCT Filed: Apr. 3, 2017

(86) PCT No.: PCT/KR2017/003660
§ 371 (c)(1),
(2) Date: Oct. 1, 2018

(87) PCT Pub. No.: WO2017/171529
PCT Pub. Date: Oct. 5, 2017

(65) Prior Publication Data
US 2019/0116475 A1    Apr. 18, 2019

Related U.S. Application Data

(60) Provisional application No. 62/401,746, filed on Sep. 29, 2016, provisional application No. 62/400,613, (Continued)

(51) Int. Cl.
*H04W 4/40*    (2018.01)
*H04W 74/08*    (2009.01)
(Continued)

(52) U.S. Cl.
CPC ............ *H04W 4/40* (2018.02); *H04W 72/02* (2013.01); *H04W 72/085* (2013.01); *H04W 74/0808* (2013.01); *H04W 74/006* (2013.01)

(58) Field of Classification Search
CPC ..... H04W 4/40; H04W 72/02; H04W 72/085; H04W 74/00; H04W 74/08; H04W 72/04;
(Continued)

(56) References Cited

U.S. PATENT DOCUMENTS 10,750,512 B2 *  8/2020  Lee .................... H04W 28/02
2008/0232433 A1  9/2008  McNew et al.
(Continued)

FOREIGN PATENT DOCUMENTS

KR      101506598         3/2015
KR      101506598 B1 *    3/2015  ............ H04W 4/027
(Continued)

OTHER PUBLICATIONS

Cheng U.S. Appl. No. 62/277,859, filed Jan 12 2016 (Year: 2016).*
(Continued)

*Primary Examiner* — Wutchung Chu
(74) *Attorney, Agent, or Firm* — Fish & Richardson P.C.

(57) ABSTRACT

The present invention provides a method for a vehicle-to-X (V2X) operation performed by means of a V2X UE in a wireless communication system, the method characterized by: determining whether or not another communication is being performed on V2X resources on which V2X communication is being performed; and performing the V2X communication on the basis of the determination, wherein a terminal drops the transmission for the V2X communication during the determining of whether or not another communication is being performed on the V2X resources on which the V2X communication is being performed.

4 Claims, 15 Drawing Sheets

Related U.S. Application Data filed on Sep. 27, 2016, provisional application No. 62/379,266, filed on Aug. 25, 2016, provisional application No. 62/374,748, filed on Aug. 12, 2016, provisional application No. 62/350,699, filed on Jun. 15, 2016, provisional application No. 62/317,410, filed on Apr. 1, 2016.

(51) Int. Cl.
  *H04W 72/02* (2009.01)
  *H04W 72/08* (2009.01)
  *H04W 74/00* (2009.01)

(58) Field of Classification Search
  CPC ........... H04W 72/0453; H04W 72/048; H04W 74/0816; H04W 72/06; H04W 92/18; H04W 76/27; H04W 74/002; H04W 36/03; H04W 36/06; H04W 36/30; H04W 36/305; H04W 48/06; H04W 4/46; H04W 28/0252; H04W 28/0493; H04W 74/0875; H04W 74/0891; H04W 84/18; H04W 28/0205; H04W 72/0493; H04L 5/0048; H04L 5/0094; H04L 67/12; H04L 1/001; H04L 47/12; H04L 47/28; H04L 47/22; H04L 47/24
  See application file for complete search history.

(56) References Cited

U.S. PATENT DOCUMENTS

| | | | |
|---|---|---|---|
| 2009/0067448 A1 | 3/2009 | Stanwood et al. | |
| 2011/0038273 A1* | 2/2011 | Li | H04L 5/0033 370/252 |
| 2012/0149389 A1 | 6/2012 | Lin et al. | |
| 2014/0119210 A1 | 5/2014 | Bansal et al. | |
| 2015/0156662 A1* | 6/2015 | Bai | H04W 28/0236 370/231 |
| 2015/0172956 A1* | 6/2015 | Noh | H04W 74/0858 370/329 |
| 2015/0249990 A1 | 9/2015 | Kadiyala et al. | |
| 2016/0037381 A1* | 2/2016 | Jung | H04W 28/0284 370/235 |
| 2016/0119191 A1* | 4/2016 | Simsek | H04L 41/145 703/13 |
| 2016/0197825 A1* | 7/2016 | Grotendorst | H04L 43/028 370/392 |
| 2017/0188391 A1* | 6/2017 | Rajagopal | H04W 74/0816 |
| 2017/0201461 A1* | 7/2017 | Cheng | H04L 47/286 |
| 2018/0199174 A1* | 7/2018 | Gozalvez-Serrano | G08G 1/161 |
| 2018/0234163 A1* | 8/2018 | Yasukawa | H04W 92/18 |
| 2018/0242190 A1* | 8/2018 | Khoryaev | H04L 47/32 |
| 2018/0242302 A1* | 8/2018 | Lee | H04L 5/0094 |
| 2018/0310200 A1* | 10/2018 | Buburuzan | H04W 28/0205 |
| 2018/0359713 A1* | 12/2018 | Boban | H04W 52/267 |
| 2018/0376474 A1* | 12/2018 | Khoryaev | H04W 76/14 |
| 2019/0021095 A1* | 1/2019 | Xi | H04W 72/1242 |
| 2019/0037534 A1* | 1/2019 | Yasukawa | H04W 52/02 |
| 2019/0075546 A1* | 3/2019 | Yasukawa | H04W 72/02 |
| 2019/0081832 A1* | 3/2019 | Marinier | H04L 5/0053 |
| 2019/0349957 A1* | 11/2019 | Sorrentino | H04W 4/90 |

FOREIGN PATENT DOCUMENTS

| | | | |
|---|---|---|---|
| WO | WO2013115629 | 8/2013 | |
| WO | WO2015115872 | 8/2015 | |
| WO | WO-2015115872 A1 * | 8/2015 | ............ H04W 72/02 |
| WO | WO2016006898 | 1/2016 | |

OTHER PUBLICATIONS

Khoryaev with U.S. Appl. No. 62/232,387, filed Sep. 24, 2015 (Year: 2015).*
International Search Report in International Application No. PCT/KR2017/003660, dated Jul. 10, 2017, 4 pages.
LG Electronics, "Discussion on transmission parameter control and multi-carrier issues for PC5-based V2V," R1-156095, 3GPP TSG RAN WG1 Meeting #82bis, Malmo, Sweden, dated Oct. 5-9, 2015, 6 pages.
Extended European Search Report in European Application No. 17775953.7, dated Oct. 9, 2019, 9 pages.

* cited by examiner

METHOD FOR V2X TRANSMISSION RESOURCE SELECTION PERFORMED BY MEANS OF TERMINAL IN WIRELESS COMMUNICATION SYSTEM AND TERMINAL USING SAME

CROSS-REFERENCE TO RELATED APPLICATIONS

This application is a National Stage application under 35 U.S.C. § 371 of International Application No. PCT/KR2017/003660, filed on Apr. 3, 2017, which claims the benefit of U.S. Provisional Applications No. 62/317,410 filed on Apr. 1, 2016, No. 62/350,699 filed on Jun. 15, 2016, No. 62/374,748 filed on Aug. 12, 2016, No. 62/379,266 filed on Aug. 25, 2016, No. 62/400,613 filed on Sep. 27, 2016, and No. 62/401,746 filed on Sep. 29, 2016, the contents of which are all hereby incorporated by reference herein in their entirety.

BACKGROUND OF THE INVENTION

Field of the Invention

The present disclosure relates to wireless communication and, more particularly, to a method for selecting V2X transmission resource performed by a terminal (or a user equipment (UE) in a wireless communication system and a terminal using the same.

RELATED ART

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater. Communication related to a vehicle, including transmission and reception of signals between vehicles with the above-mentioned extension of D2D communication, is called V2X (VEHICLE-TO-X) communication in particular.

The above-described D2D communication may be extendedly applied to signal transmission/reception between vehicles, and communication related to a vehicle is particularly termed vehicle-to-everything (V2X) communication.

In V2X, the alphabet 'X' indicates pedestrian (communication between a vehicle and a device carried y an individual (e.g., handheld terminal carried by a pedestrian, cyclist, driver, or passenger), here, V2X may also be represented by V2P, vehicle (communication between vehicles (V2V), an infrastructure/network (communication between a vehicle and a roadside unit (RSU)/network (e.g., RSU is a transportation infrastructure entity (e.g., an entity transmitting speed notifications) implemented in an eNB or a stationary UE)) (V2I/N), etc.

A (V2P communication-related) device carried by a pedestrian (or a person) will be referred to as a "P-UE" and a (V2X communication-related) device installed in a vehicle will be referred to as a "V-UE". In the present disclosure, "entity" may be interpreted as at least one of "P-UE", "V-UE" and RSU (/network/infrastructure).

A V2X UE may perform V2X communication on a predefined channel (or band). Here, not only V2X communication may be performed on a channel (or band, etc.) in which the V2X UE performs V2X communication. That is, communication other than V2X communication (e.g., 'DSRC/IEEE 802.11P service or '(other numerology-based) new RAT (NR) eV2X service) may also be performed on the channel on which the V2X UE performs V2X communication. Thus, when the V2X UE performs V2X communication on a specific channel, V2X communication may collide with another communication.

Therefore, the present disclosure proposes a method allowing 'V2X communication' and 'other communication (e.g., 'DSRC/IEEE 802.11P service' or (other numerology-based) new RAT (NR) eV2X service') to efficiently coexist on the same predefined (/signaled) channel (/band).

SUMMARY OF THE INVENTION

The present disclosure provides a method for V2X transmission resource selection performed by a terminal (or a user equipment (UE)) in a wireless communication system and a terminal using the same.

In an aspect, a method for a vehicle-to-X (V2X) operation performed by a V2X user equipment (UE) in a wireless communication system is provided. The method may comprise determining whether other communication is performed on a V2X resource on which V2X communication is performed and performing the V2X communication on the basis of the determination. The V2X UE may drop a transmission operation for the V2X communication, during the determining whether other communication is performed on the V2X resource on which the V2X communication is performed.

When other communication is performed on the V2X resource, the V2X UE may stop the V2X communication on the V2X resource for a predetermined time or performs the V2X communication on another resource.

The V2X UE may transmit, to a base station (BS), information indicating whether other communication is performed.

The V2X UE may receive information instructing to stop the V2X communication on the V2X resource for the predetermined time or information instructing to perform the V2X communication on the other resource.

When the V2X communication is performed on the other resource, the V2X UE may perform the V2X communication on the other resource which is arbitrarily determined or perform the V2X communication on the other resource which is determined on the basis of sensing.

The other resource determined on the basis of sensing may be a resource determined through partial sensing.

When the V2X communication is stopped on the V2X resource for the predetermined time, the V2X UE may re-determine whether other communication is performed on the V2X resource, and when the other communication is not performed on the V2X resource as a result of the re-determination, the V2X UE may re-perform the V2X communication on the V2X resource.

The other communication may be communication based on IEEE 802.11P.

In another aspects, a method for a vehicle-to-X (V2X) operation performed by a V2X UE in a wireless communication system is provided. The method mat comprise determining whether a congestion on a V2X channel on which V2X communication is performed is higher than a threshold and performing V2X communication on another channel if the congestion on the V2X channel is higher than the threshold.

The other channel may be a channel having a relatively low congestion, a channel whose resource occupied by another V2X UE is relatively low, or a channel from which other communication is not detected.

When a difference value between the congestion on the V2X channel and a congestion on the other channel is higher than a predetermined value, the V2X UE may perform V2X communication on the other channel.

When the V2X communication is performed on the other channel, the V2X UE may perform the V2X communication on an arbitrarily determined resource on the other channel or may perform the V2X communication on another resource determined on the basis of sensing of the other channel.

The resource determined on the basis of sensing may be a resource determined through partial sensing.

In other aspects, a user equipment (UE) is provided. The UE may comprise a radio frequency (RF) unit transmitting and receiving a radio signal and a processor combined with the RF unit to operate. The processor may determine whether other communication is performed on a V2X resource on which V2X communication is performed, and perform the V2X communication on the basis of the determination, and the V2X UE drops a transmission operation for the V2X communication, during the determining of whether other communication is performed on the V2X resource on which the V2X communication is performed.

In an aspect, a method allowing 'V2X communication' and 'other communication (e.g., 'DSRC/IEEE 802.11P service' or (other numerology-based) new RAT (NR) eV2X service') to efficiently coexist on the same predefined (/signaled) channel (/band) is provided. Thus, 'fairness regarding channel (/band) use rate (/share)' between different communications may be effectively achieved. In addition, according to the present disclosure, a method of determining resource in which V2X communication is to be performed in consideration of congestion on V2X resource. Thus, the terminal according to the present disclosure may effectively determine resources in which V2X communication is to be performed, optimizing a wireless communication system.

DESCRIPTION OF EXEMPLARY EMBODIMENTS

Figure 1:
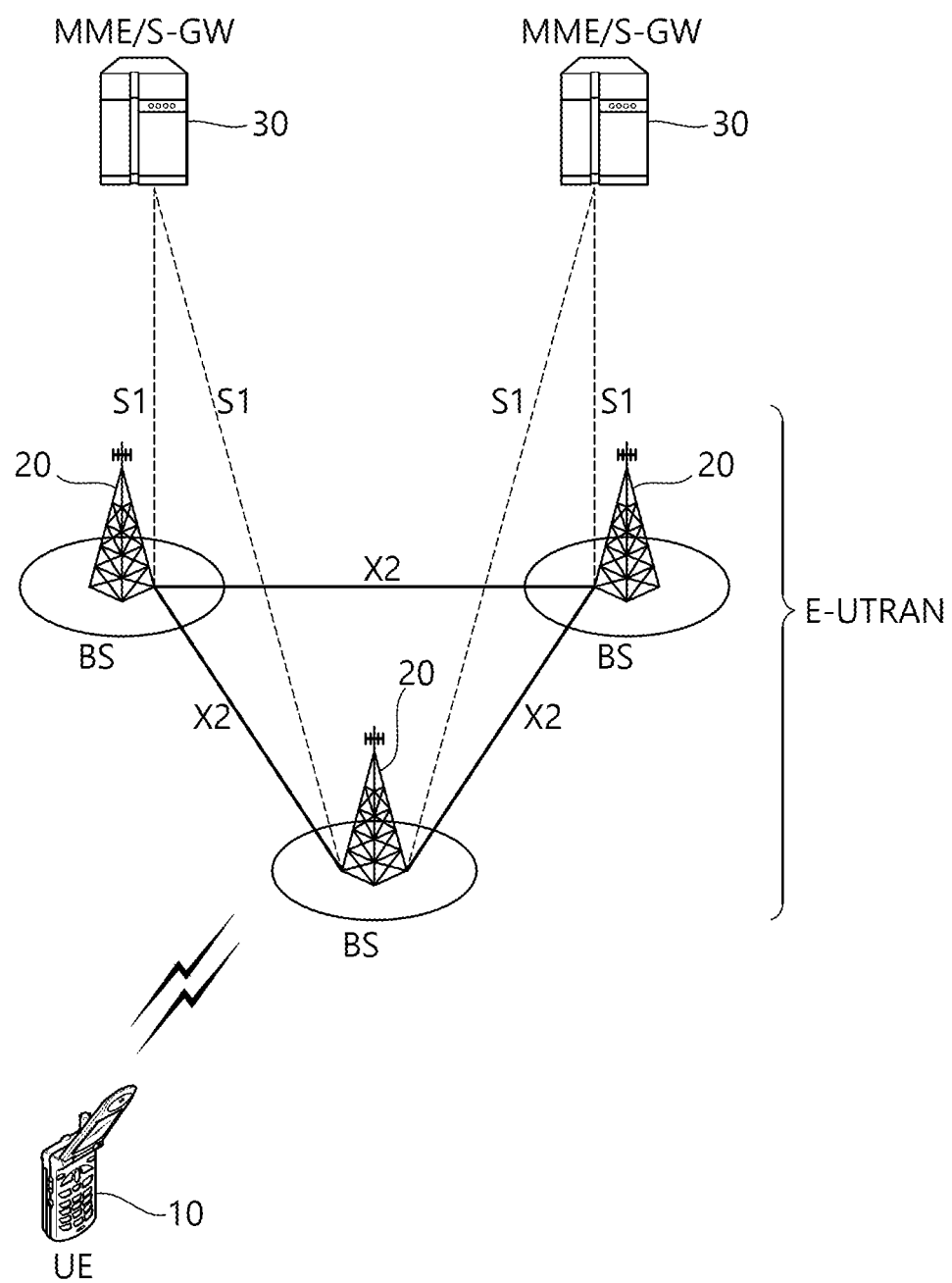
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
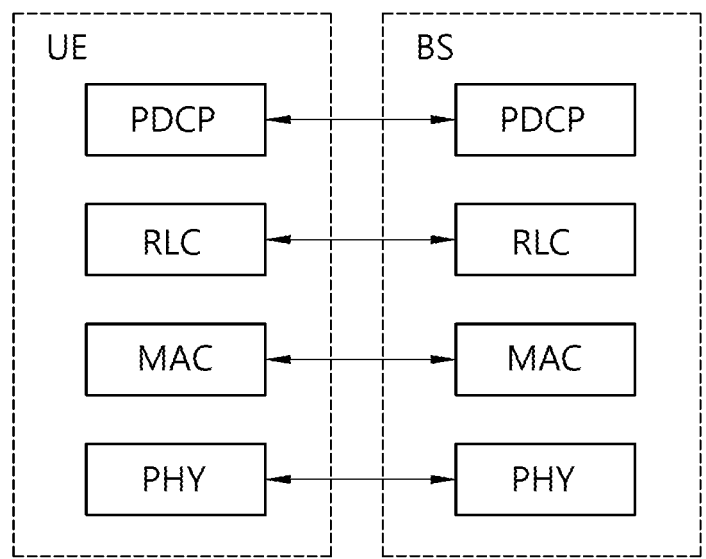
FIG. 2 is a diagram showing a wireless protocol architecture for a user plane.
Figure 3:
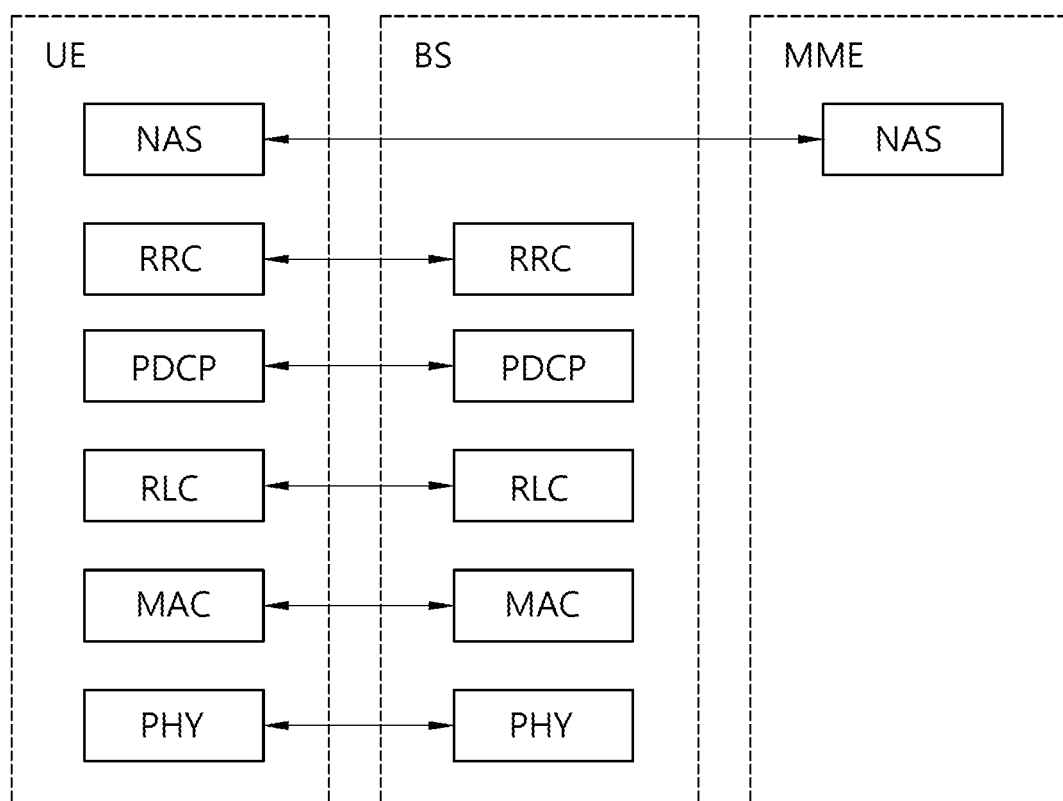
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
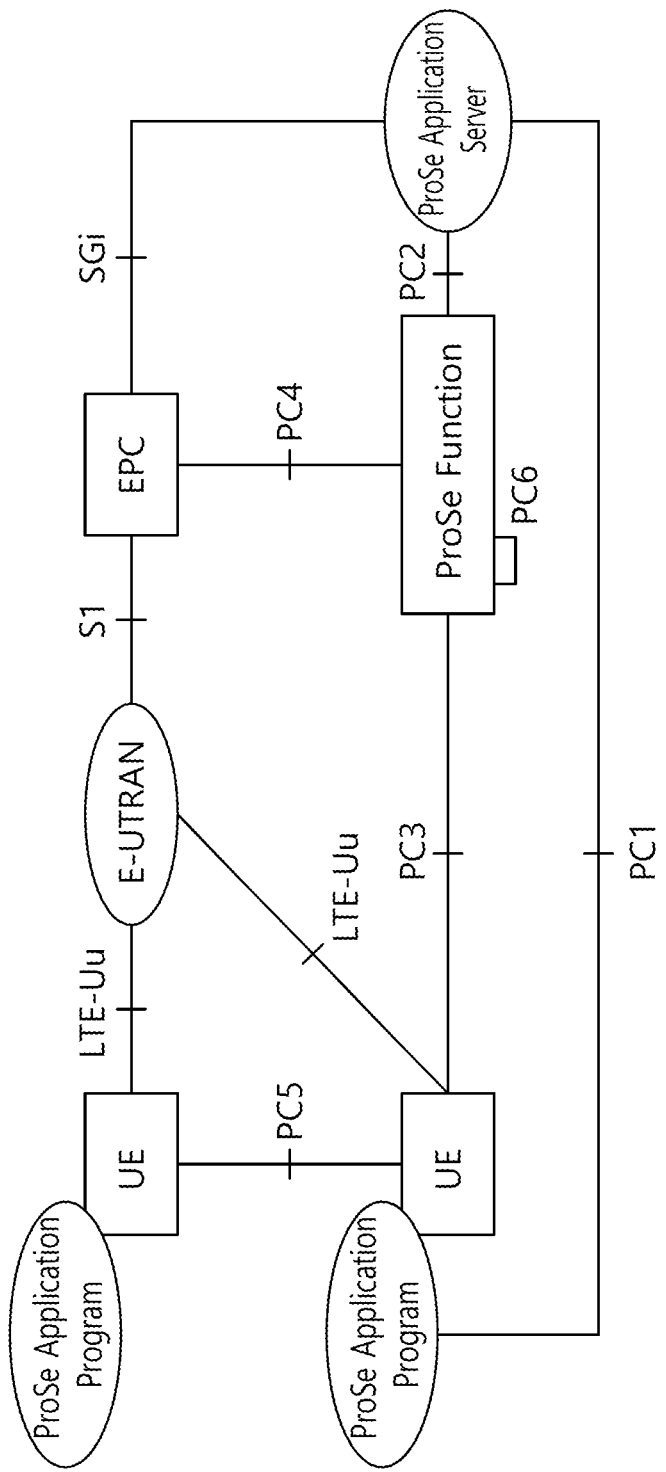
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
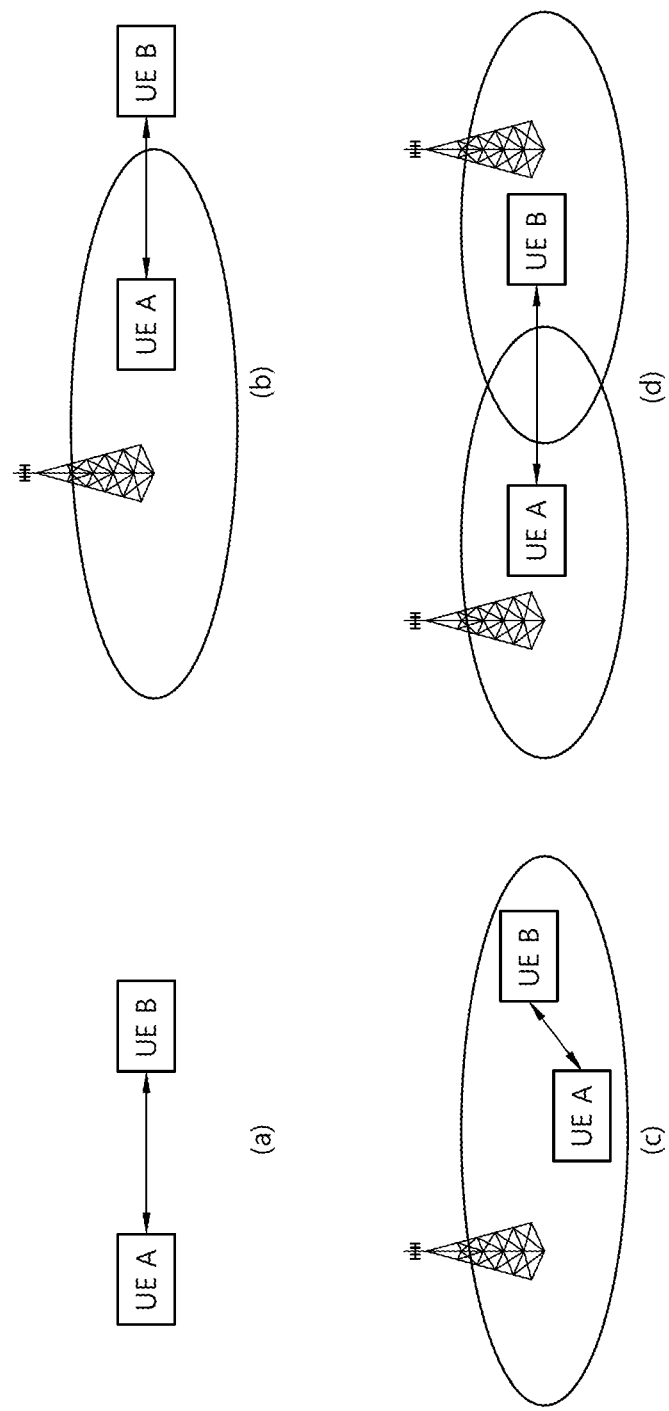
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(a), UEs A and B may be located outside of the cell coverage. Referring to FIG. 5(b), the UE A may be located in the cell coverage and the UE B may be located outside of the cell coverage. Referring to FIG. 5(c), both of UEs A and B may be located in the cell coverage. Referring to FIG. 5(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
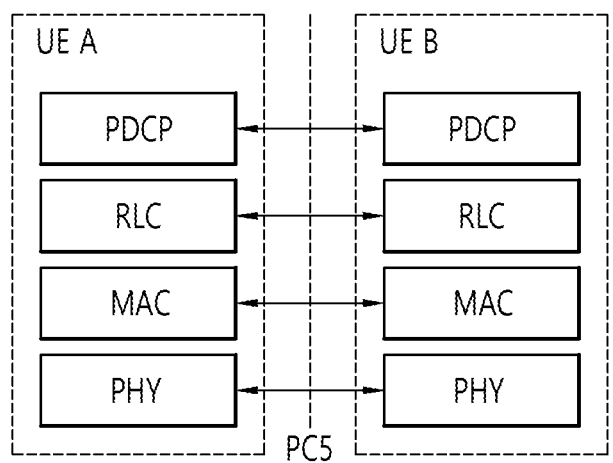
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer. There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
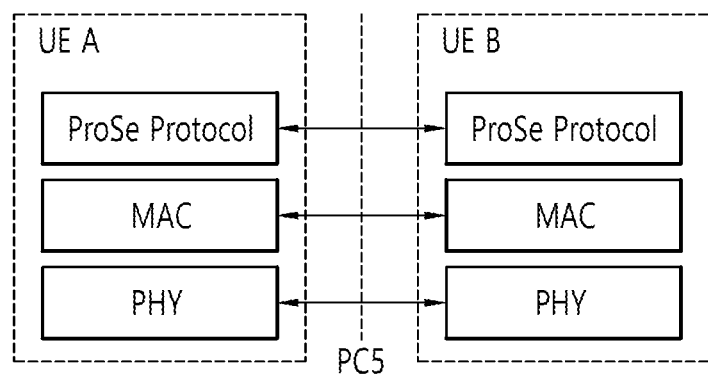
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, V2X will be described.

As described above, in general, the D2D operation may have various advantages in terms of signal transmission/reception between adjacent devices. For example, the D2D terminal may perform data communication with a high data rate and low delay. Also, the D2D operation may disperse traffic concentrated on a base station (BS), and if the terminal serves as a repeater, the terminal may serve to expand coverage of the BS. Extension of the D2D communication described above includes signal transmission/reception between vehicles, and communication related to a vehicle is particularly termed 'vehicle-to-X (V2X) communication'.

Here, for example, in V2X, the alphabet 'X' indicates pedestrian (communication between a vehicle and a device carried y an individual (e.g., handheld terminal carried by a pedestrian, cyclist, driver, or passenger), here, V2X may also be represented by V2P, vehicle (communication between vehicles (V2V), an infrastructure/network (communication between a vehicle and a roadside unit (RSU)/network (e.g., RSU is a transportation infrastructure entity (e.g., an entity transmitting speed notifications) implemented in an eNB or a stationary UE)) (V2I/N), etc. Also, for example, for the purposes of description regarding the proposed method, a (V2P communication-related) device carried by a pedestrian (or a person) will be referred to as a "P-UE" and a (V2X communication-related) device installed in a vehicle will be referred to as a "V-UE". In the present disclosure, "entity" may be interpreted as at least one of "P-UE", "V-UE" and RSU (/network/infrastructure).

A terminal (or a user equipment (UE) providing (or supporting) the above-mentioned D2D operation may be called a D2D terminal, and a terminal providing (or supporting) the above V2X operation may be called a V2X UE. Hereinafter, for the purposes of description, embodiments of the present disclosure will be described mainly from the viewpoint of the V2X UE, but the content of the V2X UE may also be applied to the D2D terminal.

The V2X UE may perform message (or channel) transmission on a predefined (or signaled) resource pool. Here, the resource pool may refer to a predefined resource(s) for the terminal to perform V2X operation (or to be able to perform V2X operation). Here, the resource pool may also be defined in terms of time-frequency, for example.

Hereinafter, the present disclosure will be described.

A V2X UE may perform V2X communication on a predefined channel (or band). Here, not only V2X communication may be performed on a channel (or band, etc.) in which the V2X UE performs V2X communication. That is, communication other than V2X communication (e.g., 'DSRC/IEEE 802.11P service or '(other numerology-based) new RAT (NR) eV2X service) may also be performed on the channel on which the V2X UE performs V2X communication. Thus, when the V2X UE performs V2X communication on a specific channel, V2X communication may collide with another communication.

Therefore, the present disclosure proposes a method allowing 'V2X communication' and 'other communication (e.g., 'DSRC/IEEE 802.11P service' or (other numerology-based) new RAT (NR) eV2X service') to efficiently coexist on the same predefined (/signaled) channel (/band). Here, for example, when the rules(/methods) are applied, 'fairness regarding channel (/band) use rate (/share)' between different communications may be effectively achieved. For example, the term of 'channel (/band/resource)' used in the present disclosure may also be interpreted as having a meaning of 'carrier (/frequency/pool)', etc.

Figure 8:
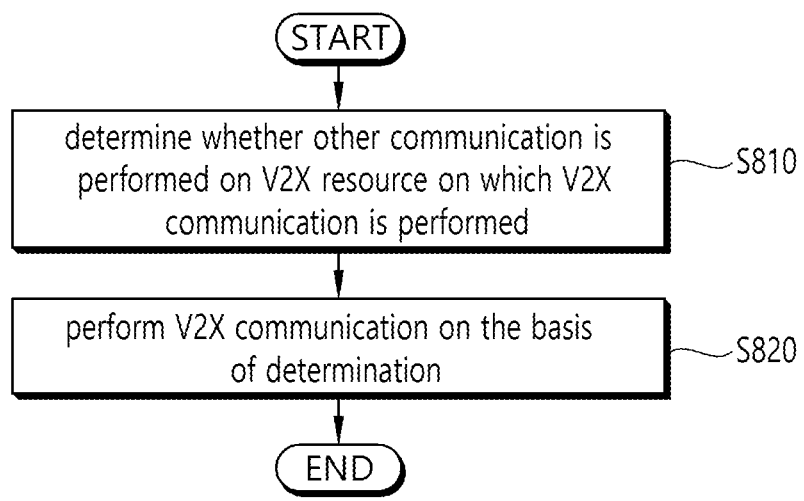
FIG. 8 is a flowchart of a method allowing V2X communication and other communication to coexist according to an embodiment of the present disclosure.

FIG. 8 is a flowchart of a method allowing V2X communication and other communication to coexist according to an embodiment of the present disclosure.

Referring to FIG. 8, a terminal may determine whether other communication is performed (/present) on a V2X resource on which V2X communication is performed (S810). Here, the terminal may refer to a V2X UE. A specific example in which the terminal determines whether other communication is performed (/present) on the V2X resource on which the terminal performs V2X communication is performed will be described later.

Thereafter, the terminal may perform the V2X communication based on the determination (S820). For example, if other communication is performed (/present) on the V2X resource, the terminal may stop V2X communication for a predetermined period of time on the V2X resource or perform V2X communication on another resource. Also, for example, the terminal may transmit, to the base station, information indicating whether other communication is performed (/present). Also, for example, the terminal may receive, from the base station, information instructing to stop the V2X communication for a predetermined period of time on the V2X resource or information instructing to perform V2X communication on another resource. Further, for example, when performing the V2X communication on the other resource, the terminal may perform the V2X communication on another arbitrarily determined resource or may perform the V2X communication on another resource determined based on sensing. Also, for example, the other resource determined based on the sensing may be a resource determined through partial sensing. Also, for example, when stopping the V2X communication for a predetermined time on the V2X resource, the terminal may re-determine whether other communication is performed (/present) on the V2X resource, and If the other communication is not performed (/not present), the terminal may re-perform the V2X communication on the V2X resource. Hereinafter, an example of determining whether other communication is performed (/present) on the V2X resource on which the terminal performs V2X communication and an example of performing V2X communication based on the determination will be described in more detail.

[Proposed method #1] V2X UE(s) participating in 'V2X communication' may drop channel/signal transmission operation (related to V2X communication) on a predefined (/signaled) specific (time/frequency) resource (which may be interpreted as a sort of 'SILENCING PERIOD') and perform an '(energy) measurement' operation.

Here, for example, the (corresponding) 'SILENCING PERIOD' related (configuration) parameters (e.g., period, (time/frequency) resource location (/length), hopping pattern, etc.) may be stored in the form of 'CARRIER(/POOL)-SPECIFIC (PRE)CONFIGURATION'. Here, for example, through the corresponding '(energy) measurement' operation, the V2X UE(s) may determine whether 'other communication (e.g., 'DSRC/IEEE 802.11 P SERVICE', '(other NUMEROLOGY-based) NR eV2X SERVICE') is being performed with an adjacent distance (and/or same channel (/band)).

Here, for example, if the '(energy) measurement' value is higher than a predefined (/signaled) threshold, (A) a rule may be defined such that 'V2X communication' on the corresponding channel (/band) is stopped (for a predefined (/signaled) time) and/or (B) a rule may be defined such that 'resource (/channel/band)' on which 'V2X communication' is performed is changed according to predefined (/signaled) rule (/priority) and/or 'V2X communication' is performed (for predetermined (/signaled) time) on (the corresponding changed) different resource (/channel/band).

Here, for example, if the '(energy) measurement' value is lower than the predefined (/signaled) threshold, the V2X UE(s) continues to perform 'V2X communication' on the corresponding channel (/band). Here, for example, a V2X resource pool configuration-related bitmap (having a predetermined (signaled) length) may not be applied to the (predefined (/signaled) (time (/frequency)) resource (e.g., 'SILENCING PERIOD') used for detecting 'other communication (and/or OTHER RAT'). Here, for example, if the corresponding rule is applied, it may be interpreted that the (predefined (signaled) (time (/frequency)) resource used for detecting 'other communication' (and/or 'OTHER RAT') is excluded from V2X resource pool configuration.

For example, a rule may be defined such that the V2X UE(s) provides information regarding whether 'other communication' is detected to a neighboring 'V2X UE(s)' (and/or '(serving) base station(/RSU)' through a predefined (/signaled) signal (/channel) (e.g., SA (/PSCCH) (e.g., an indicator (1 bit) of the corresponding purpose may be (newly) defined) and/or DATA (/PSSCH) (and/or PSBCH) (e.g., MAC CE form), etc.).

Here, for example, when reporting the corresponding information, location information of the V2X (UE(s)) (and/or resource pool (/carrier/channel/band)(index) information') in which 'other communication' is detected may be included (if '(location-based resource pool (TDM (/FDM) fragmenting operation' is configured (/signaled)).

Here, for example, the (serving) base station (/RSU) that has received this information may provide the corresponding information to the V2X UE(s) (e.g., 'P-UE(s)') on the (reported) adjacent (or the same) position (/region) (through a predefined signal (e.g., (WAN) DL (/PDSCH)).

Here, for example, the (serving) base station (/RSU) which receives the information (from V-UE(s) may allow the V2X UE(s) (e.g., 'P-UE(s)' on the (adjacent or same) position (/region) (and/or pool (/carrier/channel/band)) on which 'other communication' is detected to 'ACTIVATE/DEACTIVATE' a (related) resource pool, and/or allow the same to stop 'V2X communication' (and/or 'V2X MESSAGE TX operation') and/or indicate switching to a different carrier (/channel/band/pool) (according to a predefined (/signaled) (rule (/priority)).

Here, in another example, the V2X UE(s) (for example, 'P-UE (S)') which receives the corresponding information (from the (serving) base station/(RSU) may determine switching to a different carrier (/channel/band/pool) and whether to perform 'V2X communication' (and/or V2X MESSAGE TX OPERATION) (for a predetermined (/signaled) time) on the (corresponding changed) different resource (/channel/band)) (according to whether the V2X MESSAGE TX operation on the existing pool (/carrier/channel/band) is maintained (/stopped) and/or according to a predetermined (/signaled) (rule/(priority)) by considering (/comparing) its (current) location (and/or a pool/carrier/channel/band) in which the V2X UE(s) (currently) performs V2X MESSAGE TX operation.

Here, for example, a rule may be defined such that the reporting (/signaling) operation of the corresponding information (of the V2X UE(s)) is performed only when the '(energy) measurement' value is higher than the predefined (/signaled) threshold. Here, for example, the (serving) base station (/RSU) which receives (or has been reported about) detection information of 'other communication' from the V2X UE(s) may change (A) 'CARRIER (/channel (/band)) in which 'V2X communication' is performed (according to predefined (/signaled) rule (/priority) and/or (B) instruct to change the same into 'UU-based V2X communication'.

Here, for example, the V2X UE(s) which receives the detection information of the 'other communication' from the (adjacent) neighboring V2X UE(s) may also change the 'channel (/band/carrier)' on which 'V2X communication' is performed according to predefined (/signaled) rule (/priority) and/or stop 'V2X communication' on the corresponding channel (/band/carrier) (for predefined (/signaled) time) (and/or perform 'V2X communication' (for a predetermined (/signaled) time) on the predefined (/signaled) channel (/band/carrier/resource) (changed according to rule (/priority)).

For example, in order for the V2X UE(s) (e.g., P-UE(s)) to effectively receive the ('other communication' detection) information (re)transmitted (relayed) by the (serving) base station (/RSU) (and/or (other V2X UE(s)), the V2X UE(s) may perform 'WAKE-UP' and/or 'corresponding use channel (/signal) reception attempt' according to predefined (signaled) period (/pattern) (regardless of 'RRC_IDLE STATE').

Here, for example, the V2X UE(s) (e.g., P-UE(s)) may receive resource (selected (/reserved) for the purpose of V2X MESSAGE TX by itself (or by 'WAKING UP' only the (corresponding purpose channel (/signal) ('reflecting (including) the latest) information transmitted at the closest (period) time point (before a predetermined (/signaled) (time (/timing)) offset value from its transmission operation (time point)), and subsequently determine whether to perform (final) 'V2X communication' (and/or 'V2X MESSAGE TX operation') according to the corresponding (latest) information.

For example, a rule may be defined such that, if (V2X communication'-related) (predetermined (signaled)) 'LTE signal (/CHANNEL)' is not detected on the predefined (/signaled) specific (time/frequency) resource (and '(energy) measurement' value is higher than the predefined (/signaled) threshold (at the same time), the V2X UE(s) determines that 'other communication (e.g., 'DSRC/IEEE 802.11P SERVICE', '(other NUMEROLOGY-based) NR eV2X SERVICE')' is performed within an adjacent distance (and/or same channel (/band)).

In an example, the (serving) base station (/RSU) (and/or (other) V2X UE(s)) that receives the information regarding whether 'other communication has been detected from the specific V2X UE(s) may provide the corresponding information to adjacent (other) V2X UE(s) (e.g., 'P-UE(s)') (and/or base station (/RSU)) (which is within coverage or which has connection) through a predefined channel (/signal).

Here, for example, such information may be transmitted together with additional information such as predefined (/reported) 'location (/identifier) information of the specific V2X UE(s)' (and/or resource pool (/carrier/channel/band) (index) information in which 'other communication' is detected (in case where '(location-based resource pool (TDM (/FDM)) fragmenting operation is configured (/signaled), and/or '(energy) measurement information'), and the like.

In an example, in the case of the V2X UE(s) which has stopped 'V2X communication' on the existing channel (/band) (for a predefined (/signaled) time) (and/or which has performed 'V2X communication' on the other resource (/channel/band)) according to the rule, a rule may be defined such that 'V2X communication' is re-performed (on the existing channel (/band)) if 'other communication' is not detected after re-performing the '(energy) measurement' operation on the specific (time/frequency) resource (on the predefined (/signaled) (existing channel (/band)).

As an additional example, a rule may be defined such that 'V2X communication' on the existing channel (/band) may be performed only when (A) 'other communication' is not detected (as a result of the '(energy) measurement' operation) and/or B) a predefined (/signaled) backoff (/counter) value is smaller than or equal to 0 (or a random (real number) value ('X') selected (/picked) with a range of '0≤X≤1' is smaller than or equal to a predefined (/signaled) probability value. Here, for example, the backoff value may be reduced by a predefined (/signaled) value (e.g., '1') each time 'other communication' is not detected (when '(energy) measurement' operation is performed).

For example, it is required for the V2X UE(s) (positioned within a minimum predefined (/signaled0 distance) to simultaneously perform the '(energy) measurement' operation for detecting 'other communication' (e.g., 'DSRC/IEEE 802.11P SERVICE', 'other NUMEROLOGY-based NR eV2X SERVICE'). Otherwise, for example, 'V2X communication' may be excessively stopped by mistaking 'V2X communication' (performed within an adjacent distance (and/or the same channel (/band)) for 'other communication'.

Thus, for example, a rule may be defined such that (time/frequency) resource related information in which '(energy) measurement' operation is performed (e.g., periodicity, subframe offset, (hopping) pattern, etc.) is configured (/signaled) and applied with respect to 'GPS (GLOBAL POSITIONING SYSTEM) TIME (or UTC (COORDINATED UNIVERSAL TIME))' (or time (synchronization) of '(serving) base station /RSU), rather than (LOCAL TIME'). Here, for example, the (time/frequency) resource related information in which the '(energy) measurement' operation is performed may be configured (differently or independently) in consideration of 'V2X MESSAGE TYPE (for example, 'PERIODIC' or 'EVENT-TRIGGERD' V2X MESSAGE) and/or 'V2X MESSAGE PRIORITY' and/or 'V2X UE DENSITY (/SPEED)' and/or 'V2X MESSAGE PRIORITY' and/or 'V2X UE TYPE', and the like.

In an example, the (serving) base station (/RSU), as well as the V2X UE(s)), may (directly) perform the '(energy) measurement' operation. Here, for example, the (serving) base station (/RSU) that detects 'other communication (e.g., 'DSRC/IEEE 802.11P SERVICE', ('other NUMEROLOGY-based) NR eV2X SERVICE')' within the adjacent distance (and/or the same channel (/band)) may inform the neighboring V2X UE(s) (and/or the base station /RSU)) (within coverage or having a connection) (about whether 'V2X communication' is performed on the other resource (/channel/band) (through a predefined channel (/signal) (according to whether 'V2X communication' is stopped (on the corresponding channel (/band)) (and/or according to the predefined (/signaled) (rule (/(priority)).

In another example, (when 'CROSS CARRIER (/POOL) SCHEDULING' is performed with various purposes/reasons (for example, CONGESTION CONTROL) (for example, SA transmission and DATA transmission are performed in different CARRIERs (/POOLs) (or performed in CARRIERs (/POOLs) in which (rear) portions of DATA (/SA) REPETITION transmission are different, PHY FORMATS used in different CARRIERs (/POOLs) may be different according to a predefined (/signaled) rule (/information). Here, for example, in which PHY FORMAT (e.g., 'RE STRUCTURE') the V2X UE will transmit (control/data information) on a specific CARRIER may be informed (to other V2X UE(s)) through a (new) field on a predefined (/signaled) channel (e.g., PSCCH).

Here, for example, the PHY FORMAT of the channel (e.g., PSCCH) used for transmission of the 'scheduling/control information (and/or the PHY FORMAT information') may be defined to be the same (or in common) between different CARRIERs (/POOLs).

In another example, the V2X UE(s) may be configured to perform (transmission) resource (re)selection as follows.

Hereinafter, 1. Contents of an example of (transmission) resource (re)selection operation will be described with reference to Table 1 and 2. Contents of an example regarding an operation of (re)reservation (/selection) of transmission resource of V2X TX UE(s) will be described with reference to Table 2.

TABLE 1

1. Example of (transmission) resource (re)selection operation
A V2X UE may select a transmission resource in the following manner.
It is assumed that the terminal is in a mode in which the terminal itself selects a resource.
In this mode, when resource selection/reselection for V2X message transmission is triggered,
the terminal performs sensing and select/reselects a resource based on the sensing. The
terminal may transmit scheduling assignment indicating the selected/reselected resource.
For example, resource selection/reselection may be triggered to the terminal in a
subframe #n (also referred to as TTI hereinafter). Then, the terminal may perform sensing
between a subframe #n-a and a subframe #n-b (a > b > 0 and a and b are integers) and select a
resource for transmission of the V2X message based on the result.
The values a and b may be values commonly set for V2X UEs or values set independently
for each of the V2X UEs.
Or, when the above-mentioned values a and b are values common to the V2X UEs, a
relationship such as 'a = 1000 + b' may be established. That is, if the terminal is triggered to select
a resource for transmission of a V2X message, the terminal may perform a sensing operation for
one second (1000 ms = 1000 subframes = 1000 TTIs).
The UE may consider all of the decoded SA transmissions in a duration from the
subframe #n-a to the subframe #n-b. The decoded SA may be related to data transmission in
the duration from the subframe #n-a to the subframe #n-b, and the decoded SA which was first
transmitted before the subframe #n-a may also be considered.
A terminal which fails to perform a sensing operation in the subframe #m (for the reason
of transmitting a signal in the subframe #m, for example) may exclude subframes #(m + 100 * k)
from resource selection/reselection. Meanwhile, the terminal may skip subframes used for
transmitting a signal by the terminal, rather than performing the sensing operation.
After performing the sensing, the terminal selects a time/frequency resource for a
PSSCH, i.e., a sidelink data channel.
The UE may transmit scheduling assignment (SA) in subframe #n + c. Here, c is an integer
equal to or greater than zero, which may be a fixed value or a variable. The terminal may not
request scheduling assignment transmission (i.e., PSCCH transmission) in the subframes in
which the c value is smaller than $c_{min}$. The $c_{min}$ may be a fixed value or a value set by the network.
The scheduling assignment (SA) transmitted in subframe #n + c may indicate associated
data transmitted in subframe #n + d. d may be an integer greater than or equal to c (d ≥ c). c and d
may both be a value of 100 or less.
d may be a value equal to or less than $d_{max}$. $d_{max}$ may be determined depending on priority
such as terminal/data/service type.
The UE may indicate whether to reuse frequency resource for a signal transmitted in
subframe #n + d, for potential transmission of another transport block in subframe #n + e. Here, e
is an integer, and d is smaller than e (d < e). The terminal may explicitly or implicitly inform
about whether to reuse the frequency resource. The e value may be a single value or a plurality
of values. In addition, it may also inform that the frequency resource for the signal transmitted
in the subframe #n + d is not used after the subframe #n + e.
A reception terminal receiving a V2X signal decodes the scheduling assignment (SA)
transmitted by a transmission terminal transmitting the V2X signal. Here, it may be assumed
that the same frequency resource is reserved in a subframe #n + d + P * j (j = i, 2 * i, ..., J * i) by
the
scheduling assignment. The P may be 100. The J value may be explicitly signaled by the
scheduling assignment or may be a fixed value (e.g., 1). The i value may be explicitly signaled
by the scheduling assignment, or may be a predetermined value or a fixed value. Or, the i value
may be an integer between 0 and 10.
Meanwhile, if any of the following conditions is met, reselection of a V2X resource may
be triggered.
1) When counting meets an expiration condition.
A counting value may be reduced at every transport block transmission, and when
reselection is triggered for all the semi-statically selected resources, the counting value may be
reset. The reset value may be randomly selected with a equal probability within a certain range,
for example, between 5 and 15.
2) When a transport block does not fit to the current resource allocation although an
allowed maximum modulation and coding scheme (MCS).
3) When indicated by a higher layer.
Meanwhile, if all PSCCH/PSSCH transmissions have the same priority,
selection/reselection of PSSCH resource may be selected through the following process.
Once all resources are regarded as being selectable, specific resources are excluded based
on scheduling assignment decoding and additional conditions. Here, the terminal may select one
of the following two options.
The first option is to exclude resources indicated or reserved by the decoded scheduling
assignment and resources whose DM-RS power received in data resources associated with the
scheduling assignment is above a threshold.
The second option is to exclude resources indicated or reserved by the decoded
scheduling assignment and resources whose energy measured in data resources associated with
the scheduling assignment is above the threshold.
The terminal may select V2X transmission resource among the resources not excluded.

TABLE 1-continued

For example, the terminal may measure and rank the remaining PSSCH resources based on the total reception energy and then select a subset. The terminal may compare the energy at the currently selected resources with the energy at the subset and may select one of the subset if the energy at the currently selected resources is greater than the threshold at the energy in the subset. The terminal may randomly select one resource from the subset.
Alternatively, the terminal may measure and rank the remaining PSSCH resources based on the total reception energy, and then select a subset. The terminal may randomly select one resource from the subset.
Alternatively, the terminal may measure and rank the remaining PSSCH resources based on the total reception energy, and then select a subset. The terminal may select a resource that minimizes fragmentation of frequency resources in the subset.
Alternatively, the UE may measure reception power of the PSSCH resource indicated by the decoded scheduling assignment, add the measured reception power to the total reception power of the subframes, and then sort the subframes according to the total reception power. In the set of available subframes, the terminal randomly selects a transmission subframe. Thereafter, the terminal may randomly select a frequency from the transmission subframe.
In the above process, the terminal selects the V2X transmission resource after excluding a specific resource based on the scheduling assignment and additional conditions. Here, when the scheduling assignment and the data associated therewith are transmitted in the same subframe, a method of excluding resource based on the DM-RS reception power of the PSSCH may be supported. That is, resources that are indicated or reserved by the decoded scheduling assignment and resources whose reference signal reception power (RSRP) received in the data resources associated with the scheduling assignment are above the threshold are excluded. Specifically, the PSSCH RSRP may be defined as a linear average of the power distribution of resource elements (REs) carrying the DM-RSs associated with the PSSCH within the physical resource blocks (PRBs) indicated by the PSCCH. PSSCH RSRP may be measured using an antenna connection part of the terminal as a reference point. The scheduling assignment may include a 3-bit PPPP field.
The threshold may be given in the form of a function with respect to priority information. For example, it may be dependent on priority information of the transport block and priority information of the decoded scheduling assignment. The threshold may be given in units of [2 dBm] within a range from [−128 dBm] to [0 dBm]. A total of 64 thresholds may be preset.
It may be assumed that the terminal decodes the scheduling assignment in the subframe #m + c in the sensing period and the same frequency resource is reserved in the subframe #m + d + P * i by the scheduling assignment. As described above, P may be a fixed value of 100. i may be selected in the range [0, 1, ..., 10], which may be set or previously determined by the network carrier-specifically. i = 0 means that there is no intention to reserve the frequency resource. i may be set by a 10-bit bitmap or may be set by a 4-bit field within the scheduling assignment.
When a candidate semi-static resource X collides with a resource Y reserved by the scheduling assignment of another terminal in the period P * I and meets excluding conditions, the terminal may exclude the candidate semi-static resource X. The I is a value of i signaled by the scheduling assignment.
In case where remaining resource excluding resource through scheduling assignment decoding and sensing process is smaller than 20% of total resources within a selection window, the terminal increases the threshold (e.g., 3 dB) and performs the process of excluding resource again, and this process may be performed until the remaining resource is 20% larger than the total resource in the selection window. The total resource within the selection window refers to the resources that the terminal should consider as possible candidate resources.
Meanwhile, in the process of selecting a V2X transmission resource after excluding a specific resource, when the counting reaches value 0, the UE may maintain the current resource with the probability p and reset the counter. That is, the resource may be reselected with probability 1-p.
The carrier-specific parameter p may be previously set and may be set in the range [0, 0.2, 0.4, 0.6, 0.8].
The UE measures the remaining PSSCH resources except for a specific resource, ranks it based on the total reception energy, and then selects a subset. The subset may be a set of candidate resources having the lowest received energy. The size of the subset may be 20% of the total resources in the selection window.
The terminal may randomly select one resource from the subset.
When only one transport block is transmitted in one subframe, the UE may select M contiguous subchannels, and the average of the energy measured in each subchannel may be an energy measure value of each resource.

TABLE 2

2. Example of transmission resource (re) reservation (/selection) operation of V2X TX UE(s)
2.1. UE procedure for determining subframes and resource blocks for transmitting PSSCH and reserving resources for sidelink transmission mode 4
The number of subframes in one set of time and frequency resources for the transmission opportunity of the PSSCH is given as $C_{resel}$: Here, if $C_{resel}$ is set, $C_{resel}$ is given as [10 * SL_RESOURCE_RESELECTION_COUNTER], otherwise (that is, if $C_{resel}$ is not set), $C_{resel}$ may be set to 1.
If a set of subchannels in a subframe $t_m^{SL}$ is determined as the time and frequency resources for a PSSCH transmission corresponding to an established sidelink grant, then the same set of subchannels in the subframes $t_{m+P_{rsvp\_j}^{*SL}}$ may be determined regarding PSSCH TABLE 2-continued transmissions corresponding to the same sidelink grant. Here, j = 1, 2, . . . and a resource
reservation interval of $C_{resel} - 1$ may be determined by higher layers.
2.2. UE procedure for transmitting PSCCH
Regarding a sidelink transmission mode 4, the UE may set the contents of a SCI format
1 as follows.
If the SL_RESOURCE_RESELECTION_COUNTER is greater than 1, the UE sets a
resource reservation field to a resource reservation interval determined by higher layers
separated by $P_{step}$. Here, $P_{step} = 100$. If not, the UE sets the resource reservation field to zero.
2.3. UE procedure for determining subset of resources to be excluded in PSSCH
resource selection in sidelink transmission mode 4
When requested by higher layers in subframe n, the UE determines a set of resources
excluded in the PSSCH transmission according to the following steps. The higher layer may
determine a parameter $L_{subCH}$ corresponding to the number of subchannels used for PSSCH
transmission in a subframe, a parameter $P_{rsvp\_TX}$ corresponding to a resource reservation
interval determined by the higher layer, and a parameter $prio_{TX}$ corresponding to priority
transmitted in the SCI format 1 associated by the UE.
STEP 1) A candidate single subframe resource $R_{x,y}$ for PSSCH transmission may be
determined as a set of adjacent subchannels $L_{subCH}$ with a subchannel $x + j$ in a subframe $t_y^{SL}$.
Here, $j = 0, \ldots L_{subCH} - 1$.
STEP 2) The UE monitors subframes n-1001, n-1000, n-999, . . . , n-2, excluding a
subframe in which transmission of the UE is made. The UE may perform an operation
corresponding to the following STEPs based on the decoded PSCCHs of the monitored
subframes and the measured S-RSSI.
STEP 3) parameter $Th_{a,b}$ may be set as a value started by an i-th SL-ThresPSSCH-
RSRP field in SL-ThresPSSCH-RSRP-List-r14. Here, $i = a * 8 + b + 1$.
STEP 4) Set $S_A$ may be initialized to a combination of all candidate single subframe
resources. Set $S_B$ may be initialized to an empty set.
STEP 5) The terminal excludes THE candidate single subframe resource $R_{x,y}$ from
the set $S_A$ if the following conditions are met.
The UE may receive SCI Format 1 in a subframe $t_m^{SL}$. In the received SCI format 1,
a 'Resource reservation' field and a 'Priority' field may indicate $P_{rsvp\_RX}$ and $prio_{RX}$ values,
respectively.
PSSCH-RSRP measurement according to received SCI Format 1 may be greater than
$Th_{prio_{TX}prio_{RX}}$.
The same SCI format 1 assumed to be received in the subframe $t_{m+P_{step} \cdot P_{rsvp\_Rx}}^{SL}$ may be
determined according to resource blocks and $j = 0, 1, \ldots$ , a set of subframes that overlap with
$R_{x,y+P_{rsvp\_Tx}*j}$ regarding $C_{resel} - 1$.
STEP 6) If the number of candidate single subframe resources remaining in the set $S_A$
is smaller than $0.2 \cdot M_{total}$, STEP 4 may be repeated as 3dB-increased $Th_{a,b}$.
STEP 7) Regarding the remaining candidate single subframe resource $R_{x,y}$ in the set
$S_A$, a metric $E_{x,y}$ may be defined as a linear average of the S-RSSI measured at subchannel
$x + k$ with respect to $k = 0, \ldots L_{subcH} - 1$ in the subframes monitored at STEP 2.
STEP 8) The UE may move the candidate single subframe resource $R_{x,y}$ from the set
$S_A$ to the set $S_B$ with the minimum metric $E_{x,y}$. This step may be repeated.
The STEP 9) The set $S_C$ may be defined like the set of all candidate single subframe
resources not included in the set $S_B$.

In an example, the proposed methods described below are methods whereby the V2X UE(s) detect other communication (e.g., 'DSRC/IEEE 802.11P SERVICE', '(other NUMEROLOGY-based) NR eV2X SERVICE') on a specific channel (/band/carrier) according to the (above-described) rules and effectively performs a V2X communication-related 'sensing operation' and/or 'resource (re) selection operation' when performing 'channel (/band/carrier) switching (/changing) operation'.

Here, for example, the wording of "sensing" may be interpreted as a predefined (/signaled) reference signal (REFERENCE SIGNAL (RS)) and/or an energy measurement operation (e.g., DM-RS RSRP of a PSSCH (associated with a decoded PSCCH) and/or S-RSSI) or may be interpreted as a decoding operation for a predefined (/signaled) channel (e.g., PSCCH (PHYSICAL SIDELINK CONTROL CHANNEL)).

Here, for example, these (some) proposed methods may also be extendedly applied to a case where the V2X UE(s) performs a 'channel (/band/carrier) switching (changing) operation' according to a predefined rule (or signaling (/indicator) received from (serving) base station (/RSU)) as a 'CONGESTION LEVEL' of a specific channel (/band/carrier) in which V2X communication is performed is increased (to be higher than a predetermined (/signaled) threshold).

[Proposed method #2] When the V2X UE(s) performs a 'channel (/band/carrier) switching (/changing) operation', resources to be used for V2X communication may be randomly (re)selected from (the 'V2X RESOURCE POOL') (on the switched (/changed) channel (/band/carrier)).

Here, for example, the 'channel (/band/carrier) switching (/changing) operation' may be interpreted as a condition in which a kind of '(transmission) resource (re)selection' is triggered (/performed).

In this case, for example, the resources randomly (re) selected in accordance with the above rule may be used for 'TB (TRANSPORT BLOCK)' transmission of a predetermined (/signaled) number (e.g., '1') after performing ('channel (/band/carrier) switching (changing) operation' and may not be 'reserved' (/'SPS (SEMI-PERSISTENT SCHEDULING)') (for (a plurality of) 'TB' transmission in the future) or may not be used (/reserved) as a (frequency) resource used for (a plurality of) 'TB' transmission in the future.

Here, in another example, at the time of performing the 'channel (/band/carrier) switching (/changing) operation', randomly (re)selected resources may be (exceptionally) 'reserved (/'SPS') (for a predetermined (/signaled) number of) 'TB' transmission or may be used (/reserved) as (frequency) resource used for (a plurality of (or predetermined (signaled) number of) TB' transmissions in the future.

In another example, the V2X UE(s) may (preferentially) perform a 'sensing' operation during a predetermined (/signaled) time period on the switched (/changed) channel (/band/carrier) and (re)select (optimal) resources to be used for V2X communication based on the results.

Here, for example, the corresponding 'sensing time interval' value (and/or the "PSSCH-RSRP MEASUREMENT threshold on STEP 5 of Table 2 SECTION 2.3) (and/or M "0.2*$M_{total}$" related coefficient (/ratio) value on Table 2 SECTION 2.3. STEP 6(/8)) (e.g., a ratio value of deriving (/determining) a minimum number of (candidate) resources to remain (in the set $S_A$) (among the entire (candidate) resources) after performing STEP 5 of Table 2 SECTION 2 and/or a ratio value of deriving (/determining) a (minimum) number of (candidate) resources to remain (in the set $S_B$) after performing STEP 8 of Table 2 SECTION 2) and/or a "PSSCH-RSRP MEASUREMENT" increased value (e.g., "3DB") applied to a case where the minimum (candidate) resource number to remain in the set $S_A$ (among the entire (candidate) resources) is not satisfied after performing STEP 5 of Table 2 SECTION 2.3. and/or sensing operation (e.g., STEP 5 of Table 2 SECTION 2.3.) (for example, a period value used in STEP 8 of Table 2 SECTION 2.3.)) may be configured (/signaled) differently from application (/use) when 'channel (/band/carrier) switching (/changing) operation' is not performed (e.g., '1000 MS') (e.g., relatively small (or large) value) (or equally).

Here, in another example, when transmission resource (re)reservation (/selection) is performed, the number of assumed (/used) finite subframes (at a resource reservation (interval) period) (and/or $C_{resel}$ value (e.g., "[10*SL_RESOURCE_RESELECTION_COUNTER]") on Table 2 SECTION 2.1.) and/or a V2X message priority and/or I_VALUE (range) value selectable (/allowed) on the V2X resource pool (and/or (V2X) carrier) and/or P_STEP value and/or transmission power-related (OPEN-LOOP) parameter (/value) (e.g., "$P_O$", "ALPHA", etc.) may be configured (/signaled) to be different from (or the same as) those applied (/used) when the 'channel (/band/carrier) switching (/changing) operation' is not performed.

[Proposed Method #3] When the V2X UE(s) performs 'channel (/band/carrier) switching (changing) operation', resources to be used for V2X communication may be (re)selected (from the 'V2X RESOURCE POOL' on the switched (changed) channel (/band/carrier) according to (some) rules below.

(Example #3-1) If 'channel (/band/carrier) switching (/changing)' has been performed but if there is no packet (/message) (to be transmitted or generated) on '(LOW LAYER) buffer' (and/or 'PDCP LAYER') (or if a package (/message) has not been generated, the V2X UE(s) may (partially) perform 'sensing' operation (on the ('V2X RESOURCE POOL') on the switched (/changed) channel (/band/carrier).

Here, for example, the corresponding '(partial) sensing' operation may be performed until a packet (/message) (to be transmitted or generated) is present (reaches) on its (LOW LAYER) buffer (and/or PDCP LAYER) (or until a package (/message) is generated) (or only during a predetermined (/signaled) time interval).

Here, for example, when such a rule is applied, the V2X UE(s) may finally (re)select most appropriate (transmission) resource (from 'V2X RESOURCE POOL' on the switched (/changed) channel (/band/carrier) on the basis of the '(partial) sensing' operation results.

Here, for example, the V2X UE(s) may (re)select its (transmission) resource only (limitedly) within a resource (region) in which the '(partial) sensing' operation has been performed. Here, for example, it may be defined such that ((a plurality of) 'TB' transmission-related) (frequency) resource may be 'reserved (/'SPS') only when the '(partial) sensing' operation is performed.

In another example, although 'channel (/band/carrier) switching (/changing)' was performed, if much 'LATECNY' remains (relative to the predetermined (/signaling) threshold), the V2X UE may (partially) perform a 'sensing' operation (on the 'V2X RESOURCE POOL' on the switched (/changed) channel (band/carrier)).

(Example #3-2) (In Example #3-1) the V2X UE(s) may perform (/select) one of (A) '(partial) sensing' operation-based resource (re)selection and (B) 'random'-based resource (re)selection according to whether predetermined (signaled) conditions are met.

Here, for example, when the following (partial) conditions are met, the 'random'-based resource (re)selection (or the (partial) sensing' operation-based 'resource (re)selection) may be performed. Otherwise, '(partial) sensing' operation-based resource (re)selection (or 'random' based resource (re)selection) may be performed.

(Example #3-2-1) If a (newly) generated (or to-be-transmitted) packet (/message) is present on the '(LOW LAYER) buffer' (and/or 'PDCP LAYER') when 'channel (/band/carrier) switching (/changing)' is performed.

(Example #3-2-2) If 'LATECNY' (smaller than (predetermined (/signaled) threshold) remains when 'channel (/band/carrier) switching (/changing)' is performed.

(Example #3-2-3) If a (RESELECTION) COUNTER' value related to resource (re)selected from the 'V2X RESOURCE POOL' on the existing channel (/band/carrier) is smaller than or equal to the predetermined (/signaled) threshold (e.g., '0') (and/or if the V2X UE(s) performs (or fails to perform0 'TB' transmission re-using the (re)selected (frequency) resource by a predetermined (/signaled) number (/period) set by itself when 'channel (/band/carrier) switching (/changing)' is performed.

(Example #3-3) When the V2X UE(s) performs channel (/band/carrier) switching (/changing)', if the '(RESLECTION) COUNTER' value related to resource (re)selected from the 'V2X RESOURCE POOL' is greater than (or smaller than or equal to) the predetermined (/signaled) threshold value (e.g., 0) (and/or if the V2X UE(s) fails to perform (or has performed) 'TB' transmission re-using the (re)selected (frequency) resource by the predetermined (/signaled) number (/period) set by itself and/or if (newly) generated (or to-be-transmitted) packet (/message) is present (or is not present) on the ('LOW LAYER) buffer (and/or 'PDCP LAYER'), and/or if 'LATENCY' (smaller (or larger than the predetermined (/signaled) threshold value)) remains, then, V2X communication related (transmission) resource position on the (minimum) switched (changed) channel (/band/carrier) may be succeeded (/maintained) to be the same as that of the existing channel (/band/carrier).

Here, for example, when such a rule is applied, it may be interpreted such that some parameters (e.g., 'RESELCTION COUNTER', the number (/period) of performing 'TB' transmissions using (re)selected (frequency) resource, etc.) related to (transmission) resource (re)selection on the existing channel (/band/carrier) are succeeded to the switched (/changed) channel (/band/carrier).

Here, for example, the rule may be applied only when the 'RESOURCE POOL CONFIGURATION (/BANDWIDTH)' related to V2X communication on the existing channel (/band/carrier) and the switched (/changed) channel (/band/carrier) are the same. For example, in case where the V2X UE(s) 'switches (/changes) a 'channel (/band/carrier)' and sets a V2X communication-related (transmission) resource position on the switched (/changed) channel (/band/carrier) using sensing results regarding the existing channel (/band/carrier), the V2X UE(s) may select (/reserve) (most) appropriate resource (on the basis of the sensing results regarding the existing channel (/band/carrier) in consideration of only (V2V communication-related) resource (pool) region in which the existing channel (/band/carrier) and the switched (/changed) channel (/band/carrier) overlap (on a logical resource region).

Here, for example, in case where the V2X UE(s) 'switches (/changes) a 'channel (/band/carrier)' and sets a V2X communication-related (transmission) resource position on the switched (/changed) channel (/band/carrier) using sensing results regarding the existing channel (/band/carrier), if the corresponding (transmission) resource position (set (re)using the sensing results regarding the existing channel (/band/carrier) is (already) occupied by other V2X UE(s) on the switched (/changed) channel (/band/carrier) (which may be interpreted as a case where the V2X UE(s) has (previously) performed a sensing operation on the switched (/changed) channel (/band/carrier), for example), (A) the V2X UE(s) may reselect (and/or randomly select) only the corresponding collided (transmission) resource and/or (B) the V2X UE(s) may use only the other non-collided (/non-overlapping) (transmission) resource for the purpose of transmission of (V2X MESSAGE).

Figure 9:
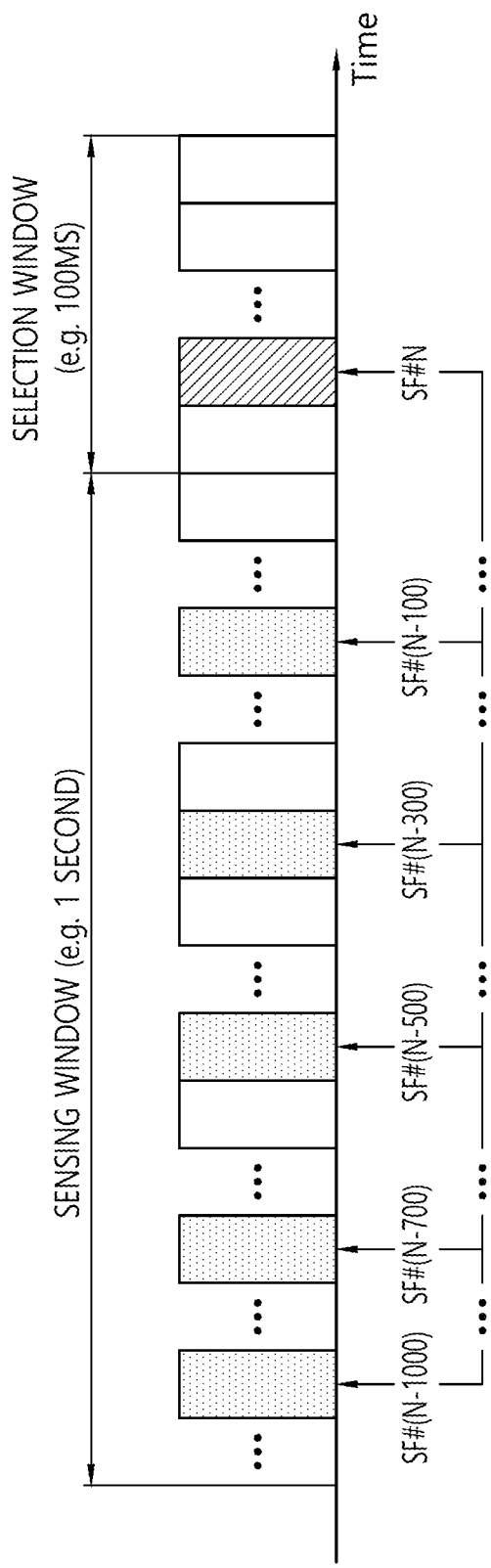
FIG. 9 illustrates a V2X transmission resource (re)selection (/reservation) method according to a (partial) sensing operation according to [proposed method #3].

FIG. 9 illustrates a V2X transmission resource (re)selection (/reservation) method according to a (partial) sensing operation according to [proposed method #3].

Referring to FIG. 9, as for a UE (i.e., P-UE), (re)selection (/reservation) of resource for V2X signal transmission may be determined (/triggered) (according to whether predefined conditions are met). For example, it is assumed that the transmission resource (re)selection (/reservation) is determined or triggered in subframe #m. In this case, the UE may (re)select (/reserve) resource for V2X signal transmission in a subframe period from subframe #m+T1 to #m+T2. The subframe period from the subframe #m+T1 to #m+T2 will be referred to as a 'selection window' hereinafter. The selection window may include 100 subframes.

The UE may select at least Y number of subframes as candidate resources in the selection window. That is, the UE may need to consider at least Y subframes as candidate resources in the selection window. The Y value may be a predetermined value or a value set by a network. However, how to select Y subframes in the selection window may be a problem of terminal implementation. That is, when the Y value is, for example, 50, which 50 subframes among 100 subframes constituting the selection window are to be selected may be selected by the UE. For example, the UE may select odd-numbered 50 subframes or even-numbered 50 subframes from among the 100 subframes. Or, the UE may select 50 subframes according to a certain rule.

Meanwhile, in order to (re)select (/reserve) a specific subframe, e.g., subframe #N(SF #N), among the Y subframes, as a V2X transmission subframe in which a V2X signal may be transmitted, the UE may need to sense at least one subframe linked to or associated with the subframe #N. The (entire) subframe period defined for sensing is called a sensing window and may include, for example, 1000 subframes. That is, the sensing window may consist of 1000 milliseconds (ms) or 1 second. For example, the UE may sense subframes corresponding to subframes #N-100*k (here, k may be a set of elements in the range of [1, 10] and may be previously set or may be a value set by the network).

In FIG. 9, a case where the k value is {1, 3, 5, 7, 10} is illustrated. That is, the UE senses subframes #N-1000, #N-700, #N-500, #N-300, and #N-100 to estimate/determine whether the subframe #N is being used by another V2X UE (and/or whether there is relatively high interference (or which is higher than a predetermined (/signaled) threshold) on the subframe #N) and (finally) select the subframe #N according to corresponding results. Since the walking UE is sensitive to battery consumption as compared with a vehicle UE, it does not sense all the subframes in the sensing window but senses only some subframes, i.e., partial sensing.

In an example, while the V2X UE(s) (capable of receiving (/sensing) a plurality of channels (/bands/carriers)) is performing a sensing (/receiving) operation regarding the plurality of (corresponding) channels (/bands/carriers) (and/or a 'DSRC/IEEE 802.11P SERVICE', '(other NUMEROLOGY-based) NR eV2X SERVICE') detecting operation), when other communication is detected from the channel (/band/carrier) in which the V2X UE(s) is currently performing a (V2X message) transmission operation, the V2X UE(s) may select one of the plurality of (corresponding) channels (/bands/carriers) used for performing the sensing (/receiving) operation (and/or other communication detecting operation) (excluding the corresponding channel/band/carrier)) and perform a channel (/band/carrier) switching (/changing) operation.

Here, for example, the V2X UE(s) may preferably or randomly select (A) a channel (/band/carrier) whose CONGESTION LEVEL (and/or a sensed energy measurement value) is (relatively) low and/or (B) a channel (/band/carrier) whose resource occupied by other V2X UE(s) is (relatively) small and/or (C) a channel (/band/carrier) in which other communication is not detected and/or (E) a channel (/band/carrier) of a (relatively) low (or high) index (and/or preferably select (a high (or low) priority) channel (/band/carrier) according to a predetermined (/signaled) priority, among the plurality of (corresponding) channels (/bands/carriers).

In an example, in a state in which the V2X UE(s) uses a (predetermined (/signaled) specific carrier (/channel/band)) for (V2X MESSAGE) transmission, if (predetermined (/signaled) other carrier (/channel/band) is determined to have a relatively low 'CONGESTION LEVEL' (and/or 'LOAD LEVEL') so the V2X UE(s) is immediately (or soon) to the other (corresponding) carrier (/channel/band), the system may be unstable.

Here, for example, in order to mitigate the problem, a switching operation to another carrier (/channel/band) (having a relatively low 'CONGESTION LEVEL' (and/or 'LOAD LEVEL')) may be (limitedly) performed only when (A) a timer for maintaining (V2X MESSAGE) transmission on the existing carrier (/channel/band) is set (/signaled) (before the ('CONGESTION LEVEL' (and/or 'LOAD LEVEL')-based carrier (/channel/band) switching is applied) and/or (B) only when a 'CONGESTION LEVEL DIFFERENCE' (and/or 'LOAD LEVEL DIFFERENCE') exceeds a predetermined (/signaled) threshold (e.g., which may be interpreted as ('CONGESTION LEVEL' (and/or 'LOAD LEVEL')-related 'HYSTERESIS').

For example, it is assumed that there are resource (RES_L) whose 'RAT' of the V2X UE(s) is set (/signaled) to have a (relatively) low priority and resource (RES_H) whose 'RAT' of the VEX UE(s) is set to have a (relatively) high priority (See Table 3). Here, in a state in which the V2X UE(s) performs V2X communication on the 'RES_H', if a (measured) ('RES-H'-related) 'CONGESTION LEVEL' value is greater than a predetermined (/signaled) threshold (CL_RSC_H) (e.g., "CL_RSC_H' may be considered as a threshold associated with 'RES_H' so the V2X UE(s) considers switching (/offloading) to the 'RES_L', (actual) switching (from 'RES_H' to 'RES_L' may be allowed only when the 'RES_L' related (measured) 'CONGESTION LEVEL' value is smaller than the predetermined (/signaled) threshold (CL_RSC_L) (for example, 'CL_RSC_L' may be considered as a threshold associated with 'RES_L'). Here, for example, 'CL_RSC_H' and 'CL_RSC_L' may be set (/signaled) to different values (for example, 'CL_RSC_H>CL_RSC_L').

For example, the V2X UE(s) may perform a 'CONGESTION LEVEL' (and/or 'LOAD LEVEL') measurement operation (and/or 'other communication' (e.g., 'DSRC/IEEE 802.11P SERVICE', '(other NUMEROLOGY-based) NR eV2X SERVICE') (and/or 'OTHER RAT') detecting operation) even in a (predetermined (/signaled) (external) resource region, rather than a V2X resource pool (designated in the form of 'CARRIER(/CELL)-SPEICIFC NETWORK (PRE)CONFIGURATION')

Here, for example, if the corresponding 'CONGESTION LEVEL' (and/or 'LOAD LEVEL') measurement result (regarding the (external) resource region) is high, it may be determined that 'other communication' (and/or 'OTHER RAT') is present (or exists).

Here, for example, the corresponding 'CONGESTION LEVEL' (and/or 'LOAD LEVEL') measurement (regarding the (external) resource region) (and/or 'other communication' (and/or 'OTHER RAT') detection may also be performed on a predetermined (/signaled) (separate) sub-channel (on the (external) resource region) and/or in the entire band (on the (external) resource region).

Here, for example, an (S-RSSI) measurement operation (related to 'CONGESTION LEVEL' (and/or 'LOAD LEVEL') measurement) may be performed within the V2X resource(s) regardless of V2X resource pool. Here, for example, the corresponding (S-RSSI) measurement operation (related to the 'CONGESTION LEVEL' (and/or 'LOAD LEVEL') measurement) may be performed in the form of '(V2X) POOL-SPECIFIC' (or (V2X) POOL-COMMON) form and a region other than the (V2X) POOL may be separately measured. Here, for example, in the (partial) rule, the measurement operation (within the V2X resource(s)) may be performed only in (V2X) TX POOL (and/or (V2X) RX POOL) (on the corresponding carrier).

For example, if the V2X TX UE(s) switches the ('V2X communication' (and/or 'V2X MESSAGE TX operation')-related) carrier (/channel/band/pool) (according to predetermined (signaled) rule (/priority), the V2X TX UE(s) may signal (/broadcast) about to which carrier (/channel/band/pool) the V2X TX UE(s) is to switch, to a (neighboring) V2X RX UE(s) (in advance) through a predefined channel (e.g., 'PSCCH (/PSSCH)' and/or 'PSBCH').

Here, for example, a carrier (/channel/band/pool) to which a channel of the corresponding purpose is transmitted may be predetermined (/signaled) (in the form of 'UE-COMMON').

For example, Table 3 shows a method whereby 'V2X communication' and 'other communication (e.g., 'DSRC/IEEE 802.11P SERVICE', ('other NUMEROLOGY-based) NR eV2X SERVICE') effective coexist.

TABLE 3

Figure 10:
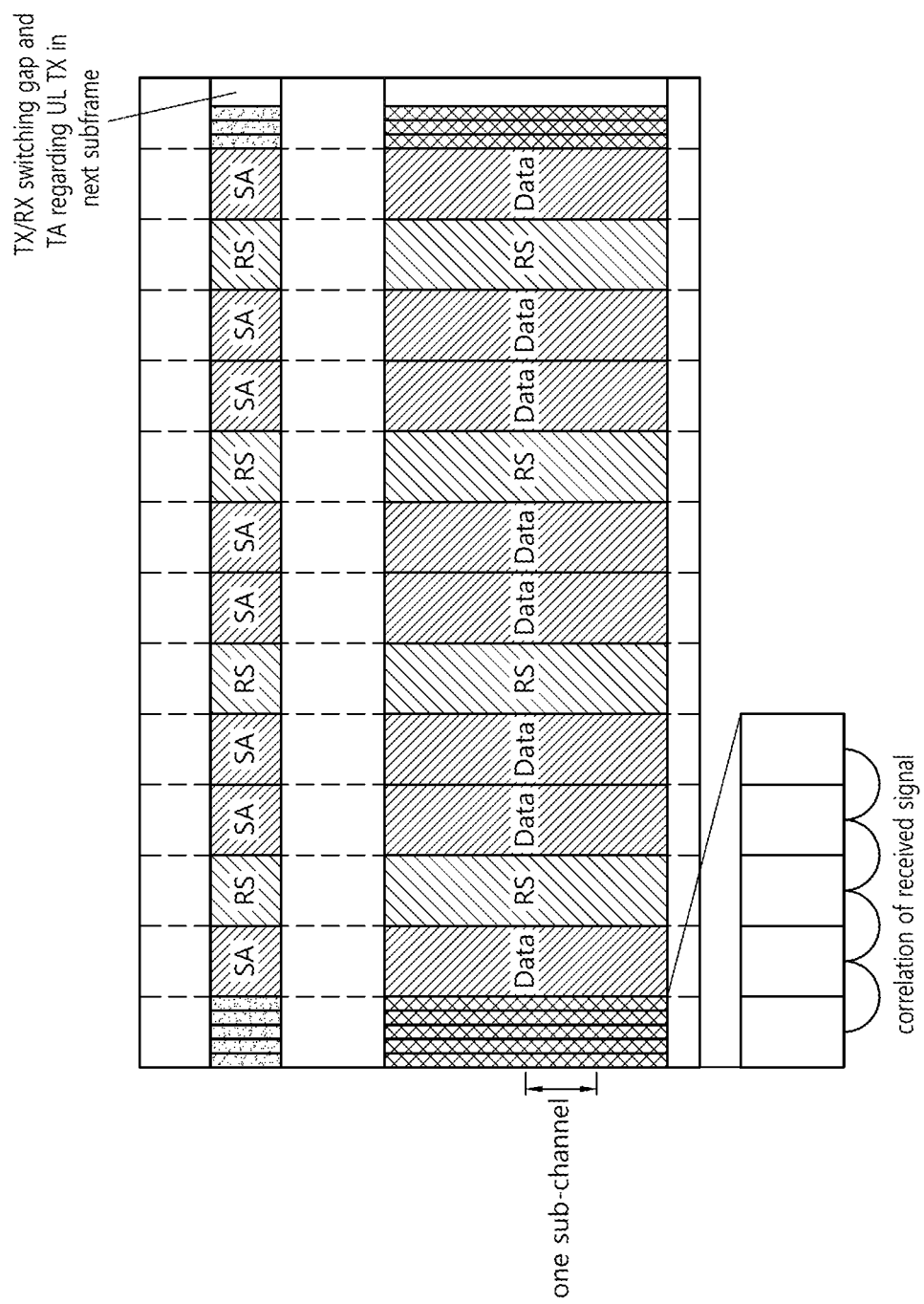
FIG. 10 illustrates an example of an LTE SL V2V detection signal using time repetition of a short sequence.
Figure 11:
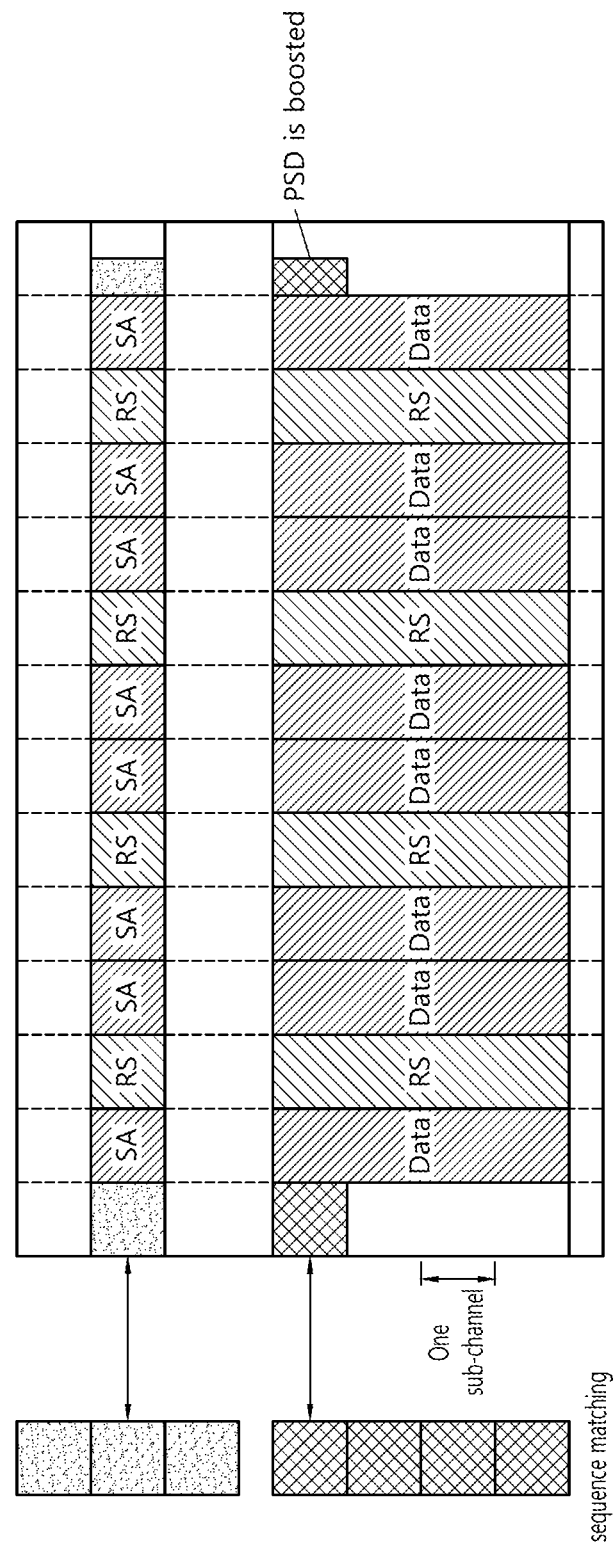
FIG. 11 is an example of an LTE SL V2V detection signal using sequence matching in the frequency domain.

3. Example of method whereby 'V2X communication' and 'other communication' effectively coexist
Proposal 1: LTE SL V2V design must consider coexistence with NR (new RAT, i.e., new radio access technology) V2X to coexist with DSRC (Dedicated Short-Range Communications). That is, LTE SL V2V design for coexistence with NR V2X must be considered.
3.1. Possible solutions identified in SI phase
Proposal 2: RAN1 specification support may not be required for "geographical location and database" and "time sharing between systems based on GNSS timing" option.
3.2. Detection of another RAT
Proposal 3: The LTE UE may detect the presence of other RATs when high energy is observed in a resource without LTE transmission. The "resource without LTE transmission" may be a resource configured like an implicit resource or a resource in which an LTE signal is not retrieved.
Proposal 4: Even when a load on LTE SL V2V is high, a solution may be required to guarantee a transmission opportunity of IEEE 802.11p.
In order to ensure detectability, transmission of a detection signal each time a UE transmits a PSCCH/PSSCH in a subframe may become a reference line. One approach is to use first and/or last symbols (including the possibility to use some of these symbols) within frequency resources of the corresponding PSCCH/PSSCH. However, such a design must ensure an operation performed in these symbols. Here, automatic gain control (AGC) may be performed in the first symbol, and TX/RX switching and absorbing of UL (uplink) TX timing advance may be performed in the last symbol. Hereinafter, two options for a detection signal of the LTE SL V2V will be described.
FIG. 10 illustrates an example of an LTE SL V2V detection signal using time repetition of a short sequence.
According to FIG. 10, in the first option, a short sequence may be repeated in a time domain within the first and/or last symbol. An intended operation of the detection device is to use the so-called "delay correlation" of a reception signal that a time domain reception signal is delayed by a detected sequence length and correlated to a next reception signal.
In this operation, the device does not sense the sequence itself but may identify a specific repeating pattern of the signal in the time domain. Thus, the device does not need to know the exact sequence used by a transmitter, which may be an advantage for a detector using a different RAT.
FIG. 11 is an example of an LTE SL V2V detection signal using sequence matching in the frequency domain.
According to FIG. 11, in a second option, the detection device may match each sequence of each frequency resource. Since a transmission bandwidth of the PSSCH may not be known to the detection device, a resource block (RB) size of a detection signal may be fixed to one TABLE 3-continued subchannel size, for example, in order for every terminal to use the same sequence while a single carrier is appropriately maintained. In order to support AGC in the first symbol and maintain the same coverage, power spectral density (PSD) needs to be boosted in detection signal transmission using a portion of the PSSCH transmission bandwidth.
Proposal 5: When a predetermined signal is used for inter-RAT detection, a new LTE SL signal needs to be transmitted at the first and/or last symbol of every subframe in which the UE transmits the PSCCH/PSSCH. Here, AGC should be guaranteed at the first symbol and operations such as TX/RX switching, timing advance absorption for the UL TX, and the like, should be guaranteed at the last symbol.
3.3. Use of resources potentially shared with other RATs
A detect-and-vacate operation assumes prioritized access to resources. In other words, when a prioritized RAT is detected, the priority of the RAT is set so that other RATs may stop using the resource. Therefore, it may be necessary to define terminal operations as to when the terminal will transmit on resources that may potentially be used by another RAT having a higher priority. Further, it may be further discussed whether two RATs may be of the same priority, and, for example, the principle "first-come first served" may be adopted.
Proposal 6: In the vacate operation, different RATs in a given set of resources may be assumed to have different priorities.
When a low priority RAT (e.g., RAT A) detects a high priority RAT (e.g., RAT B) in a specific resource set X (where RAT has low priority), the low priority RAT (e.g., RAT A) may stop the transmission. The related question is, which resources are used for the transmission of RAT A if a certain level of latency and reliability requirements are required in the transmission. In this case, it is not reasonable to stop the transmission, and thus, a basic assumption is that there is another resource set Y in which RAT A has high priority. Thus, from the RAT point of view, the resource set Y may be used for the base resource, and the resource set X may correspond to a kind of auxiliary set that is opportunistically used for offload.
RAT A may use the resource set X only when offloading is required. Otherwise, since inter-RAT detection is not perfect, it may cause interference to RAT B. In addition, unnecessary multi-carrier operation must be prevented as much as possible in consideration of the limitation of the number of operating carriers of each terminal and overhead/latency of switching and alignment of operating carriers through a UE. This may mean that the UE does not use a resource set of a low priority RAT when the resource set of the high priority RAT does not have a congestion problem.
Proposal 7: In the detect-and-vacate operation, it may be assumed that each RAT has a highest priority resource set. The UE may consider using other resources only when congestion is detected in the set in which the RAT has the highest priority.
The resource sets in which the LTE SL V2V has low priority may be set in a plurality of carriers. In this case, a reception UE may need to know which carrier is to be used for the offloading purpose at a transmission UE. To support this operation, a UE may broadcast information on a transmission carrier to UEs in the vicinity of the UE. In order to support alignment used for the carriers used throughout the terminals, the carriers may be considered first for the carrier of the first order.
Random resource selection or limited resource detection discussed for V2P may be considered a fallback operation if a time for completely monitoring the carrier switched by the UE is not allowed. Meanwhile, if each UE has a multi-carrier receiving function and is already monitors the candidate carrier, then the fallback operation may not be necessary. Therefore, the assumed multi-carrier capacity may be discussed first.
Proposal 8: If detect-and-vacate is operated through multiple carriers, it is necessary to discuss how to perform the carrier sorting among the terminals.
3.4. Inter-RAT coexistence in V2P case
In the case of V2P, the scenario of P-UE transmission and V-UE reception is prioritized during the SI phase. However, if a coexistence mechanism is used for the V2P case, limited P-UE reception capability is required to be considered for coexistence between RATs based on detection. One possibility is to operate each P-UE to detect another RAT before transmission, but this will require more battery consumption and Rx functionality of a PC5 carrier. The P-UE may have a limitation in that it may not detect the presence of another RAT in a subframe in which monitoring is not performed although a partial sensing operation is performed.
The support of eNB may be considered to solve this problem. Each V-UE may report detection of another RAT to an eNB along with its location information. The eNB may forward the information to the P-UE, and the P-UE may determine transmission of the P-UE by obtaining location information portion of the related V-UE from the forwarded information. Optionally, the eNB may activate/deactivate a resource pool for P-UEs within the region based on the report from the V-UEs.
Proposal 9: If detect-and-vacate is performed on the V2P case, a solution may be required for the P-UE to recognize the presence of other RATs. V-UE reporting and eNB forwarding may be considered.
3.5. The above proposals are summarized as follows.
Proposal 1: LTE SL V2V design to coexist with DSRC (Dedicated Short-Range Communications) should consider expansion regarding NR V2X.
Proposal 2: RAN1 specification support may not be required for "Geographical location and database" and "Time sharing between systems based on GNSS timing" option.
Proposal 3: The LTE UE may detect the presence of other RATs when high energy is observed in a resource without LTE transmission. The "resource without LTE transmission" may be a resource configured like an implicit resource or a resource in which an LTE signal is not retrieved.
Proposal 4: Even when a load on LTE SL V2V is high, a solution may be required to guarantee a transmission opportunity of IEEE 802.11.
Proposal 5: When a predetermined signal is used for inter-RAT detection, a new LTE SL signal needs to be transmitted at the first and/or last symbol of every subframe in which the UE transmits the PSCCH/PSSCH. Here, AGC should be guaranteed at the first symbol and TABLE 3-continued operations such as TX/RX switching, timing advance absorption for the UL TX, and the like, should be guaranteed at the last symbol
Proposal 6: In the vacate operation, different RATs in a given set of resources may be assumed to have different priorities.
Proposal 7: In the detect-and-vacate operation, it may be assumed that each RAT has a highest priority resource set. The UE may consider using other resources only when congestion is detected in the set in which the RAT has the highest priority.
Proposal 8: If detect-and-vacate is operated through multiple carriers, it is necessary to discuss how to perform the carrier sorting among the terminals.
Proposal 9: If detect-and-vacate is performed on the V2P case, a solution may be required for the P-UE to recognize the presence of other RATs. V-UE reporting and eNB forwarding may be considered.

It is obvious that the examples of the proposed methods described above may also be included as one of the implementing methods of the present disclosure, and thus, it may be considered as a kind of proposed methods. Also, the proposed methods described above may be implemented independently or in combination (or merge) of some of the proposed methods. For example, in the present disclosure, the proposed methods based on the 3GPP LTE system have been described for convenience of description but the scope of the system to which the proposed methods are applied may be extended to other systems than the 3GPP LTE system. For example, the proposed methods of the present disclosure may be extendedly applied to D2D communication. Here, for example, D2D communication refers to communication between a UE and another UE directly using a wireless channel. Here, for example, the UE refers to a user terminal, but a base station and network equipment which transmit/receive signals according to the communication methods between UEs may also be regarded as a sort of UEs. Also, for example, the proposed methods of the present disclosure may be limitedly applied only to the MODE 2 V2X operation (and/or the MODE 1 V2X operation). Also, for example, the proposed methods of the present disclosure may be limitedly applied only to V-UE(s) (or P-UE(s)) and/or V2X UE(s) having DEDICATED RX (/TX) CHAIN (for V2X carrier (/channel/band)). In addition, for example, (some) proposed methods of the present disclosure may also be extendedly applied even to a case where (some) specific (transmission (/reception)) carrier (/resource pool) (used for (actual) V2X message transmission (/reception)) is to be selected from among a plurality of (predetermined (/signaled) (transmission (/reception)) (candidate carrier (/resource pools) according to a predefined (/signaled) reference (e.g., CHANNEL BUDY RATIO (CBR), etc.)

In the above, the examples of how V2X communication and other communication coexist have been described. Hereinafter, for the sake of convenience, specific examples of a method in which V2X communication and other communication coexist as described above will be described with reference to the drawings. Hereinafter, examples in which V2X communication and other communication coexist, which will be described with reference to the drawings, are described only once again for convenience of understanding of the contents described above and do not intend to exclude the configurations applied to the present disclosure described above. That is, hereinafter, since the contents which may be applied to contents to be described hereinafter have already been described, descriptions thereof will be omitted.

Figure 12:
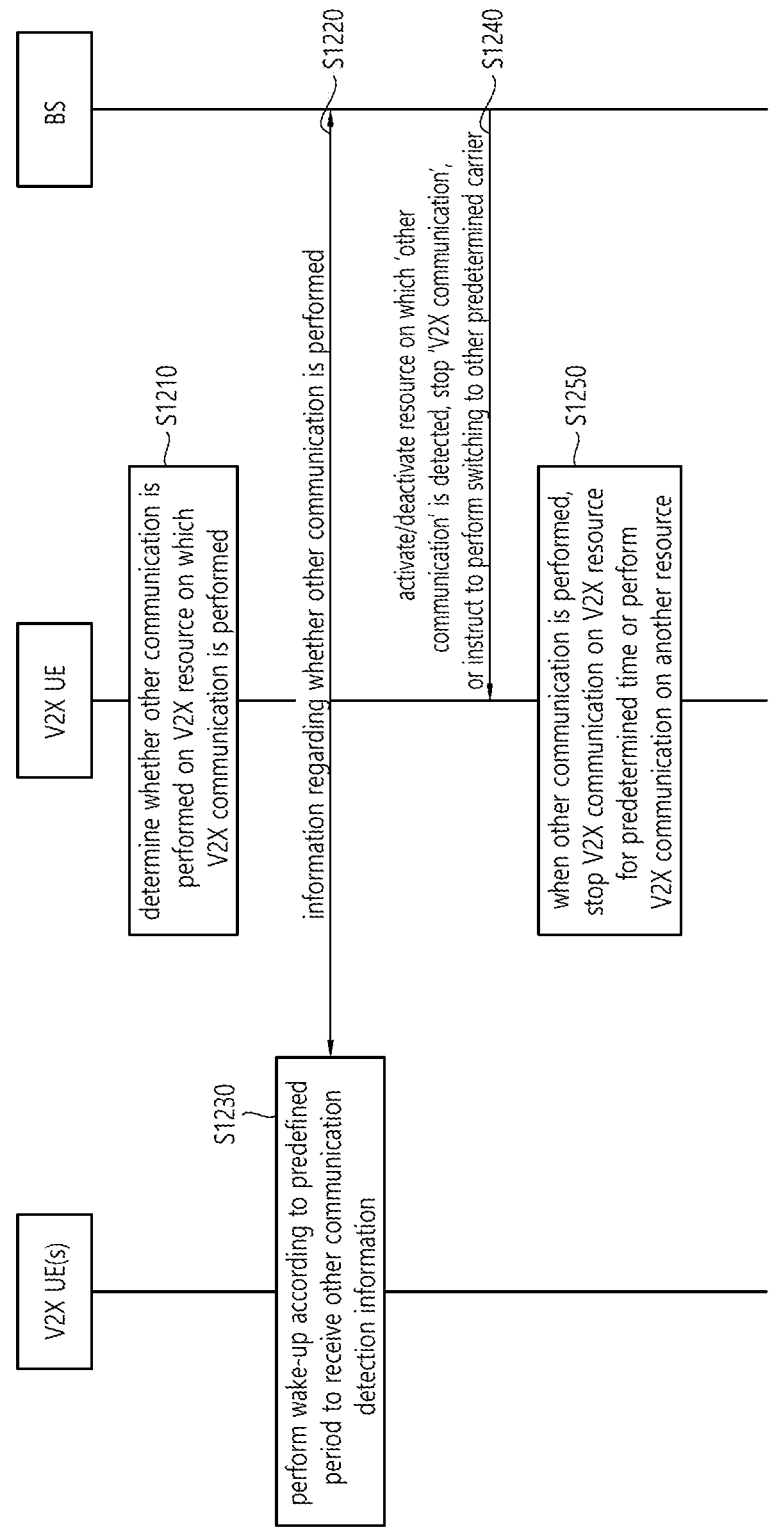
FIG. 12 is a flowchart illustrating a method in which V2X communication and other communication coexist according to another embodiment of the present disclosure.

FIG. 12 is a flowchart illustrating a method in which V2X communication and other communication coexist according to another embodiment of the present disclosure.

Referring to FIG. 12, a UE may determine whether other communication is performed (/exists) on a V2X resource on which V2X communication is performed (S1210). Here, as described above, the UE may determine whether other communication is performed (/exists) on the V2X resource through energy sensing. More specifically, if an energy sensing value exceeds a threshold, the UE may determine that other communication is performed (/exists) on the V2X resource. A specific example in which the UE determines whether other communication is performed (/exists) on the V2X resource has been described, and thus, a detailed description thereof will be omitted.

The UE may transmit information regarding whether other communication is performed (/exists) to a base station (BS) or other V2X UE(s) (S1220). Here, the UE may selectively transmit the information to the BS or another UE. Here, for example, a rule may be defined such that the V2X UE(s) informs a neighboring 'V2X UE(s)' (and/or '(serving) BS/RSU)') about whether 'other communication' is detected through a predefined (/signaled) signal (/channel). Here, for example, when the corresponding information is reported, location information thereof (and/or 'other communication'-detected resource pool (/carrier/channel/band) (index) information') (in case where '(location-based resource pool (TDM (/FDM)) fragmenting operation is configured (/signaled)) may be included. A specific example in which the UE transmits the information to the BS or the other UE is as described above, and thus, a detailed description thereof will be omitted.

In order to receive other communication detection information, a (specific) UE may perform a wake-up operation in accordance with a predefined period (S1230). Here, the UE performing the wake-up may also determine whether other communication is performed (/exists) on the V2X resource on which the V2X communication is performed. In addition, as described above, in an example, in order for the V2X UE(s) (e.g., P-UE(s)) to effectively receive the ('other communication' detection) information (re)transmitted (relayed) by the (serving) base station (/RSU) (and/or (other V2X UE(s)), the V2X UE(s) may perform 'WAKE-UP' and/or 'corresponding use channel (/signal) reception attempt' according to predefined (signaled) period (/pattern) (regardless of 'RRC_IDLE STATE'). Since a specific example of the present disclosure is as described above, a detailed description thereof will be omitted.

The UE may 'ACTIVATE/DEACTIVATE' the resource in which 'other communication' is detected, stop 'V2X communication', or receive information indicating switching to a predetermined other carrier from the BS (S1240). Here, for example, the (serving) base station (/RSU) which receives the information (from V-UE(s) may allow the V2X UE(s) (e.g., 'P-UE(s)' on the (adjacent or same) position (/region) (and/or pool (/carrier/channel/band)) on which 'other communication' is detected to 'ACTIVATE/DEACTIVATE' a (related) resource pool, and/or allow the same to stop 'V2X communication' (and/or 'V2X MESSAGE TX operation') and/or indicate switching to a different carrier (/channel/band/pool) (according to a predefined (/signaled) (rule (/priority)). Since A specific example of the present disclosure is as described above, a detailed description thereof will be omitted.

If the other communication is performed (/detected), the UE may stop the V2X communication for a predetermined time on the V2X resource or perform the V2X communication on another resource (S1250). Here, for example, if the '(energy) measurement' value is higher than a predefined (/signaled) threshold, (A) a rule may be defined such that 'V2X communication' on the corresponding channel (/band) is stopped (for a predefined (/signaled) time) and/or (B) a rule may be defined such that 'resource (/channel/band)' on which 'V2X communication' is performed is changed according to predefined (/signaled) rule (/priority) and/or 'V2X communication' is performed (for predetermined (/signaled) time) on (the corresponding changed) different resource (/channel/band). Here, for example, if the '(energy) measurement' value is lower than the predefined (/signaled) threshold, the V2X UE(s) continues to perform 'V2X communication' on the corresponding channel (/band). Since a specific example of the present disclosure is as described above, a detailed description thereof will be omitted.

Hereinafter, an example in which the UE performs the V2X communication on another resource when it is determined that other communication is performed (/detected) on the V2X resource will be described in more detail with reference to a flowchart.

Figure 13:
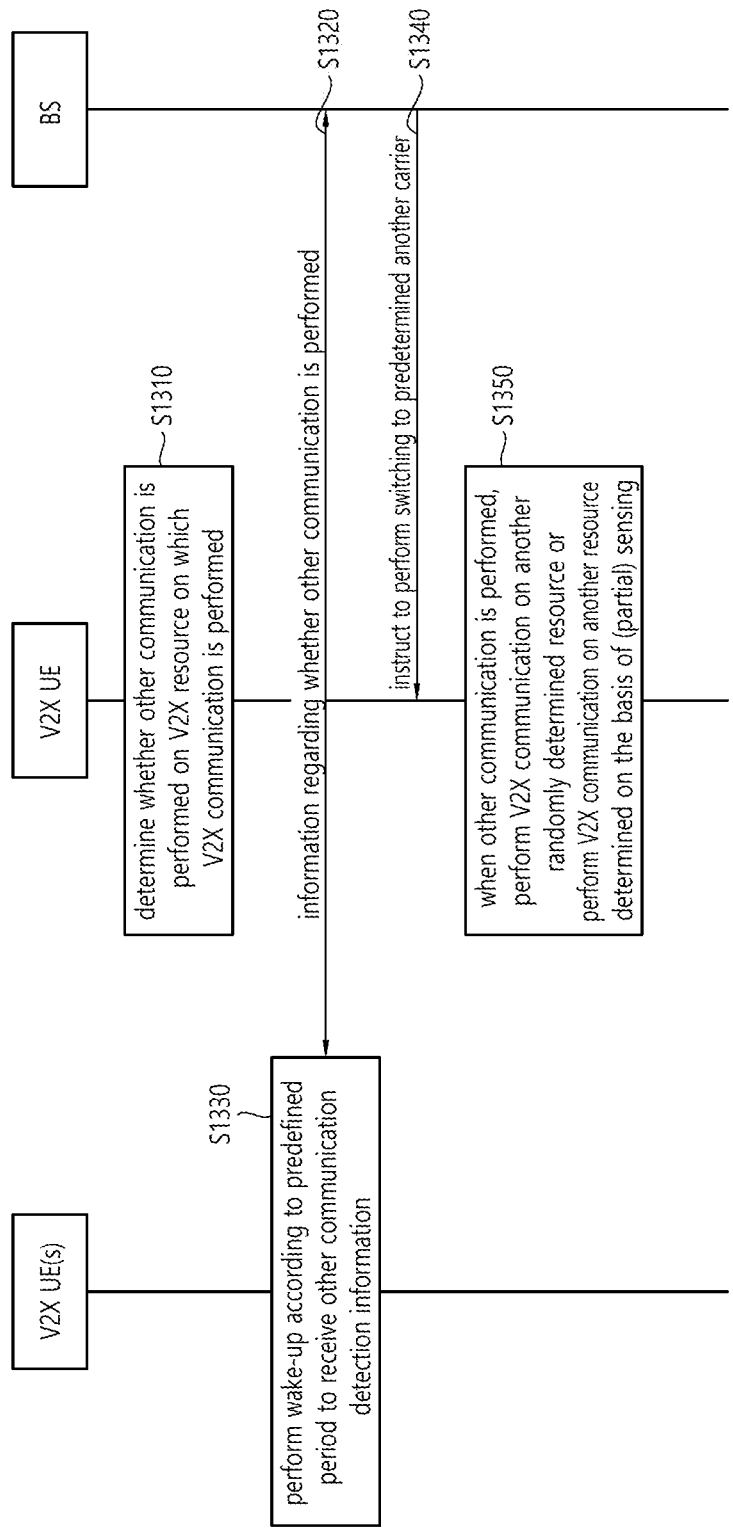
FIG. 13 is a flowchart of a method in which V2X communication and other communication coexist according to another embodiment of the present disclosure.

FIG. 13 is a flowchart of a method in which V2X communication and other communication coexist according to another embodiment of the present disclosure.

Referring to FIG. 13, a UE may determine whether other communication is performed (/detected) on a V2X resource on which V2X communication is performed (S1310). A specific example in which the UE determines whether other communication is performed (/detected) on the V2X resource is as described above, and thus, a detailed description thereof will be omitted.

The UE may transmit information on whether other communication is performed (/detected) to the BS or another V2X UE(s) (S1320). A specific example in which the UE transmits the information to the BS or the other UE is as described above, and thus, a detailed description thereof will be omitted.

In order to receive other communication detection information, a (specific) UE may perform wakeup according to a predefined period (S1330). Since a specific example thereof is as described above, a detailed description thereof will be omitted.

The UE may receive information indicating switching to another predetermined carrier from the BS (S1340). Here, a specific example in which the UE receives information indicating switching to another predetermined carrier from the BS is as described above, and thus, a detailed description thereof will be omitted.

In case where other communication is performed (/detected), the UE may perform the V2X communication on other resource determined randomly (after carrier switching) or perform the V2X communication on other resource determined based on (partial) sensing (S1350).

For example, as described above, when the V2X UE(s) performs a 'channel (/band/carrier) switching (/changing) operation', resources to be used for V2X communication may be randomly (re)selected from (the 'V2X RESOURCE POOL') (on the switched (/changed) channel (/band/carrier)). In another example, the V2X UE(s) may (preferentially) perform a 'sensing' operation during a predetermined (/signaled) time period on the switched (/changed) channel (/band/carrier) and (re)select (optimal) resources to be used for V2X communication based on the results.

For example, when the V2X UE(s) performs 'channel (/band/carrier) switching (changing) operation', resources to be used for V2X communication may be (re)selected (from the 'V2X RESOURCE POOL' on the switched (changed) channel (/band/carrier) according to (some) rules below.

For example, if 'channel (/band/carrier) switching (/changing)' has been performed but if there is no packet (/message) (to be transmitted or generated) on '(LOW LAYER) buffer' (and/or 'PDCP LAYER') (or if a package (/message) has not been generated, the V2X UE(s) may (partially) perform 'sensing' operation (on the ('V2X RESOURCE POOL') on the switched (/changed) channel (/band/carrier). Also, when the V2X UE(s) performs channel (/band/carrier) switching (/changing)', if the '(RESLECTION) COUNTER' value related to resource (re)selected from the 'V2X RESOURCE POOL' is greater than (or smaller than or equal to) the predetermined (/signaled) threshold value (e.g., 0) (and/or if the V2X UE(s) fails to perform (or has performed) 'TB' transmission re-using the (re)selected (frequency) resource by the predetermined (/signaled) number (/period) set by itself and/or if (newly) generated (or to-be-transmitted) packet (/message) is present (or is not present) on the ('LOW LAYER) buffer (and/or 'PDCP LAYER'), and/or if 'LATENCY' (smaller (or larger than the predetermined (/signaled) threshold value)) remains, then, V2X communication related (transmission) resource position on the (minimum) switched (changed) channel (/band/carrier) may be succeeded (/maintained) to be the same as that of the existing channel (/band/carrier).

Here, a specific example in which, in case where other communication is performed (/detected), the UE performs the V2X communication on other resource determined randomly (after carrier switching) or performs the V2X communication on other resource determined based on (partial) sensing is described above, and thus, a detailed description thereof will be omitted.

The foregoing methods have been mainly described in terms of a method in which V2X communication and other communication coexist, but the above-described contents may also be described in that the UE determines a resource for performing V2X communication and performs V2X communication on the determined resource in terms of congestion. Hereinafter, the method in which the UE performs V2X communication on other resource in consideration of congestion on the V2X resource will be described with reference to the accompanying drawings.

Figure 14:
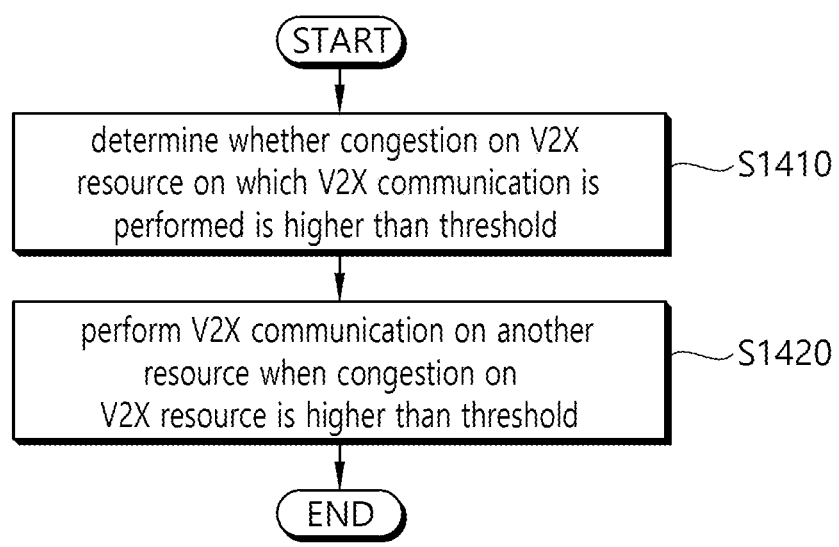
FIG. 14 is a flowchart illustrating a method of determining a resource on which V2X communication is performed based on congestion according to an embodiment of the present disclosure.

FIG. 14 is a flowchart illustrating a method of determining a resource on which V2X communication is performed based on congestion according to an embodiment of the present disclosure.

Referring to FIG. 14, the UE determines whether congestion on a V2X resource on which V2X communication is performed is higher than a threshold (S1410). Here, as described above, the V2X UE(s) may perform a 'channel (/band/carrier) switching (changing) operation' according to a predefined rule (or signaling (/indicator) received from (serving) base station (/RSU)) as a 'CONGESTION LEVEL' of a specific channel (/band/carrier) in which V2X communication is performed is increased (to be higher than a predetermined (/signaled) threshold). Since a specific example of the present disclosure is as described above, a detailed description thereof will be omitted.

Thereafter, if the congestion on the V2X resource is higher than the threshold, the UE may perform V2X communication on another resource (S1420). Here, the details of which resource the terminal may select to perform V2X communication on the resource is as described above.

As described above, for example, the V2X UE(s) may preferably or randomly select (A) a channel (/band/carrier) whose CONGESTION LEVEL (and/or a sensed energy measurement value) is (relatively) low and/or (B) a channel (/band/carrier) whose resource occupied by other V2X UE(s) is (relatively) small and/or (C) a channel (/band/carrier) in which other communication is not detected and/or (E) a channel (/band/carrier) of a (relatively) low (or high) index (and/or preferably select (a high (or low) priority) channel (/band/carrier) according to a predetermined (/signaled) priority, among the plurality of (corresponding) channels (/bands/carriers).

For example, in a state in which the V2X UE(s) uses a (predetermined (/signaled) specific carrier (/channel/band)) for (V2X MESSAGE) transmission, if (predetermined (/signaled) other carrier (/channel/band) is determined to have a relatively low 'CONGESTION LEVEL' (and/or 'LOAD LEVEL') so the V2X UE(s) is immediately (or soon) to the other (corresponding) carrier (/channel/band), the system may be unstable. Here, for example, in order to mitigate the problem, a switching operation to another carrier (/channel/band) (having a relatively low 'CONGESTION LEVEL' (and/or 'LOAD LEVEL')) may be (limitedly) performed only when (A) a timer for maintaining (V2X MESSAGE) transmission on the existing carrier (/channel/band) is set (/signaled) (before the ('CONGESTION LEVEL' (and/or 'LOAD LEVEL')-based carrier (/channel/band) switching is applied) and/or (B) only when a 'CONGESTION LEVEL DIFFERENCE' (and/or 'LOAD LEVEL DIFFERENCE') exceeds a predetermined (/signaled) threshold (e.g., which may be interpreted as ('CONGESTION LEVEL' (and/or 'LOAD LEVEL')-related 'HYSTERESIS').

For example, the V2X UE(s) may perform a 'CONGESTION LEVEL' (and/or 'LOAD LEVEL') measurement operation (and/or 'other communication' (e.g., 'DSRC/IEEE 802.11P SERVICE', '(other NUMEROLOGY-based) NR eV2X SERVICE') (and/or 'OTHER RAT') detecting operation) even in a (predetermined (/signaled) (external) resource region, rather than a V2X resource pool (designated in the form of 'CARRIER(/CELL)-SPEICIFC NETWORK (PRE)CONFIGURATION'). Here, for example, if the corresponding 'CONGESTION LEVEL' (and/or 'LOAD LEVEL') measurement result (regarding the (external) resource region) is high, it may be determined that 'other communication' (and/or 'OTHER RAT') is present. Here, for example, the corresponding 'CONGESTION LEVEL' (and/or 'LOAD LEVEL') measurement (regarding the (external) resource region) (and/or 'other communication' (and/or 'OTHER RAT') detection may also be performed on a predetermined (/signaled) (separate) sub-channel (on the (external) resource region) and/or in the entire band (on the (external) resource region). Here, for example, an (S-RSSI) measurement operation (related to 'CONGESTION LEVEL' (and/or 'LOAD LEVEL') measurement) may be performed within the V2X resource(s) regardless of V2X resource pool. Here, for example, the corresponding (S-RSSI) measurement operation (related to the 'CONGESTION LEVEL' (and/or 'LOAD LEVEL') measurement) may be performed in the form of '(V2X) POOL-SPECIFIC' (or (V2X) POOL-COMMON) form and a region other than the (V2X) POOL may be separately measured. Here, for example, in the (partial) rule, the measurement operation (within the V2X resource(s)) may be performed only in (V2X) TX POOL (and/or (V2X) RX POOL) (on the corresponding carrier).

Here, a specific example of performing V2X communication on other resources if the congestion on the V2X resource is higher than the threshold is as described above, and, thus, a detailed description thereof will be omitted below.

Figure 15:
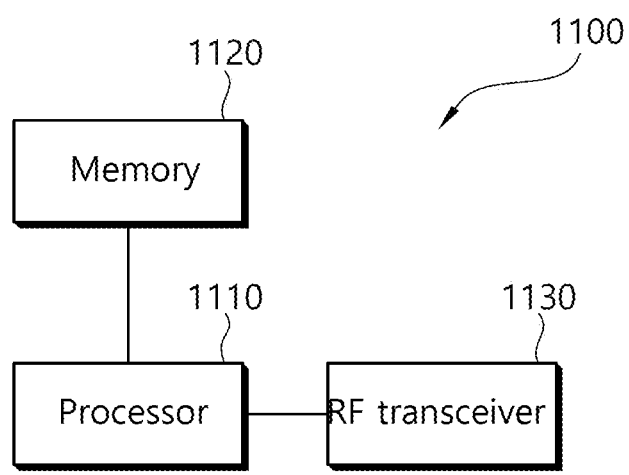
FIG. 15 is a block diagram illustrating a UE in which an embodiment of the present disclosure is implemented.

FIG. 15 is a block diagram illustrating a UE in which an embodiment of the present disclosure is implemented.

Referring to FIG. 15, a UE 1100 includes a processor 1110, a memory 1120, and a radio frequency (RF) unit 1130.

According to an embodiment, the processor 1110 may perform the functions/operations/methods described in the present disclosure. For example, the processor 1110 may determine whether other communication is performed on a V2X resource on which V2X communication is performed. The processor 1110 may transmit information regarding whether other communication is performed, to a BS or the V2X UE. The processor 1110 may 'activate/deactivate' a resource in which 'other communication' is detected, stop 'V2X communication', or receive information instructing switching to predetermined other carriers, from the BS. If other communication is performed, the processor 1110 may stop the V2X communication on the V2X resource for a predetermined time or perform V2X communication on another resource.

The RF unit 1130 is connected to the processor 1110 and transmit and receive a radio signal.

The processor may include an application-specific integrated circuit (ASIC), other chipsets, logic circuitry, and/or a data processing device. The memory may include a read-only memory (ROM), a random access memory (RAM), a flash memory, a memory card, storage medium, and/or other storage devices. The RF unit may include a baseband circuit for processing a radio signal. When the embodiment is implemented by software, the above-described techniques may be implemented with modules (processes, functions, and so on) that perform the functions described above. The module is stored in the memory and may be executed by the processor. The memory may be present within or outside the processor and may be coupled to the processor by various well known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for vehicle-to-X (V2X) operation in a wireless communication system, the method performed by a V2X user equipment (V2X UE) and comprising:
   selecting a first carrier on which the V2X operation is performed;
   measuring a channel congestion level related to the first carrier,
   wherein the channel congestion level related to the first carrier is measured based on a sidelink received signal strength indicator (S-RSSI) for a sidelink channel;

selecting the first carrier or a second carrier based on determining whether to perform a carrier switch from the first carrier to the second carrier based on threshold information, wherein the first carrier is different from the second carrier, wherein the threshold information is received from a base station by the V2X UE, wherein the threshold information is information regarding a threshold which is related to congestion of a channel based on a UE autonomous resource selection and is used for the carrier switch, wherein the threshold is used for determining whether, based on a carrier reselection being triggered, the V2X UE keeps using the first carrier for the V2X operation or not; and performing the V2X operation on the first carrier or the second carrier, wherein, based on the channel congestion level related to the first carrier being below the threshold used for the carrier switch, the V2X UE does not perform the carrier switch, keeps the first carrier, and performs the V2X operation on at least one V2X resource of the first carrier, and based on the channel congestion level related to the first carrier not being below the threshold used for the carrier switch, the V2X UE performs the carrier switch from the first carrier to the second carrier and performs the V2X operation on at least one V2X resource of the second carrier.

2. The method of claim 1, wherein, based on the UE autonomous resource selection, the V2X UE monitors a plurality of subframes during monitoring durations, selects at least one resource based on monitoring and performs the V2X operation on the at least one resource.

3. A vehicle-to-X user equipment (V2X UE) configured to perform V2X operation, the V2X UE comprising:
   a transceiver;
   at least one processor; and
   at least one computer memory operably connectable to the at least one processor and storing instructions that, when executed by the at least one processor, perform operations comprising:

selecting a first carrier on which the V2X operation is performed;

measuring a channel congestion level related to the first carrier;

wherein the channel congestion level related to the first carrier is measured based on a sidelink received signal strength indicator (S-RSSI) for a sidelink channel;

selecting the first carrier or a second carrier based on determining whether to perform a carrier switch from the first carrier to the second carrier based on threshold information, wherein the first carrier is different from the second carrier, wherein the threshold information is received from a base station by the V2X UE, wherein the threshold information is information regarding a threshold which is related to congestion of a channel based on a UE autonomous resource selection and is used for the carrier switch, wherein the threshold is used for determining whether, based on a carrier reselection being triggered, the V2X UE keeps using the first carrier for the V2X operation or not; and performing the V2X operation on the first carrier or the second carrier, wherein, based on the channel congestion level related to the first carrier being below the threshold used for the carrier switch, the V2X UE does not perform the carrier switch, keeps the first carrier, and performs the V2X operation on at least one V2X resource of the first carrier, and based on the channel congestion level related to the first carrier not being below the threshold used for the carrier switch, the V2X UE performs the carrier switch from the first carrier to the second carrier and performs the V2X operation on at least one V2X resource of the second carrier.

4. The V2X UE of claim 3, wherein, based on the UE autonomous resource selection, the V2X UE monitors a plurality of subframes during monitoring durations, selects at least one resource based on monitoring and performs the V2X operation on the at least one resource.

* * * * *